US012693394B2

(12) United States Patent
Kato et al.

(10) Patent No.: US 12,693,394 B2
(45) Date of Patent: Jul. 28, 2026

(54) APPARATUS AND METHOD FOR MEASURING DISTANCE AND/OR VELOCITY OF OBJECT

(71) Applicant: Panasonic Intellectual Property Management Co., Ltd., Osaka (JP)

(72) Inventors: Yumiko Kato, Osaka (JP); Kohei Kikuchi, Osaka (JP); Kenji Narumi, Osaka (JP); Hiroyuki Takagi, Osaka (JP); Yasuhisa Inada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 475 days.

(21) Appl. No.: 18/461,362

(22) Filed: Sep. 5, 2023

(65) Prior Publication Data

US 2023/0408653 A1     Dec. 21, 2023

Related U.S. Application Data

(63) Continuation of application No. PCT/JP2022/005824, filed on Feb. 15, 2022.

(30) Foreign Application Priority Data

Mar. 30, 2021     (JP) ................................. 2021-057407

(51) Int. Cl.
    *G01S 7/4911*    (2020.01)
    *G01S 7/481*    (2006.01)
    *G01S 17/58*    (2006.01)

(52) U.S. Cl.
    CPC ........... *G01S 7/4911* (2013.01); *G01S 7/4816* (2013.01); *G01S 17/58* (2013.01)

(58) Field of Classification Search
    None
    See application file for complete search history.

(56) References Cited

U.S. PATENT DOCUMENTS

| 2008/0252899 A1 | 10/2008 | Morosawa et al. |
| 2019/0383907 A1 | 12/2019 | Belsley et al. |

FOREIGN PATENT DOCUMENTS

| JP | 2008-514910 | 5/2008 |
| JP | 2008-261778 | 10/2008 |

(Continued)

OTHER PUBLICATIONS

The EPC Office Action dated Aug. 19, 2024 for the related European Patent Application No. 22779594.5.

(Continued)

*Primary Examiner* — Hovhannes Baghdasaryan
(74) *Attorney, Agent, or Firm* — Rimon P.C.

(57)     ABSTRACT

A measurement apparatus includes a light source, an interference optical system, a photodetector, a processing circuit, and a storage apparatus. The interference optical system splits light emitted from the light source into reference light and output light and generates interfering light between reflected light resulting from reflection of the output light on an object and the reference light. The photodetector outputs a detection signal corresponding to strength of the interfering light. The processing circuit modulates the frequency of the light outputted from the light source with a period including an up-chirp duration in which the frequency increases and a down-chirp duration in which the frequency decreases. The storage apparatus stores first correction data for the up-chirp duration and second correction data for the down-chirp duration. The processing circuit determines distance or velocity based on a signal obtained by correcting the detection signal based on the first or second correction data.

12 Claims, 20 Drawing Sheets

(56)         References Cited

FOREIGN PATENT DOCUMENTS

| JP | 2014-185973 | 10/2014 |
| JP | 2014-202716 | 10/2014 |
| JP | 2017-181269 | 10/2017 |
| JP | 2019-045200 | 3/2019 |
| JP | 2019-537012 | 12/2019 |
| JP | 2021-004800 | 1/2021 |
| WO | 2006/035199 | 4/2006 |
| WO | 2018/160240 | 9/2018 |
| WO | 2018/230474 | 12/2018 |

OTHER PUBLICATIONS

International Search Report of PCT application No. PCT/JP2022/005824 dated Apr. 26, 2022.

FIG. 17
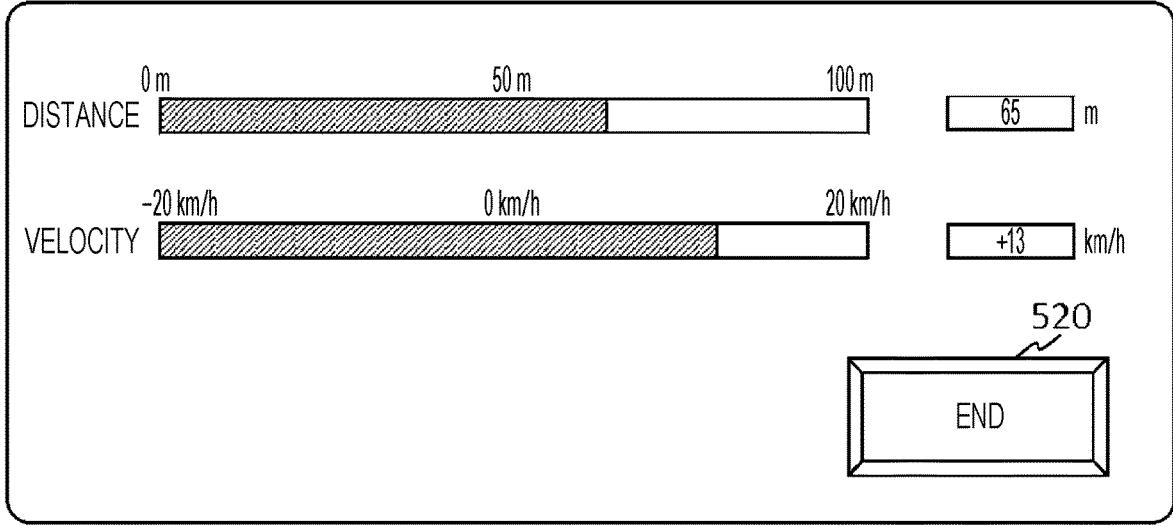
FIG. 18
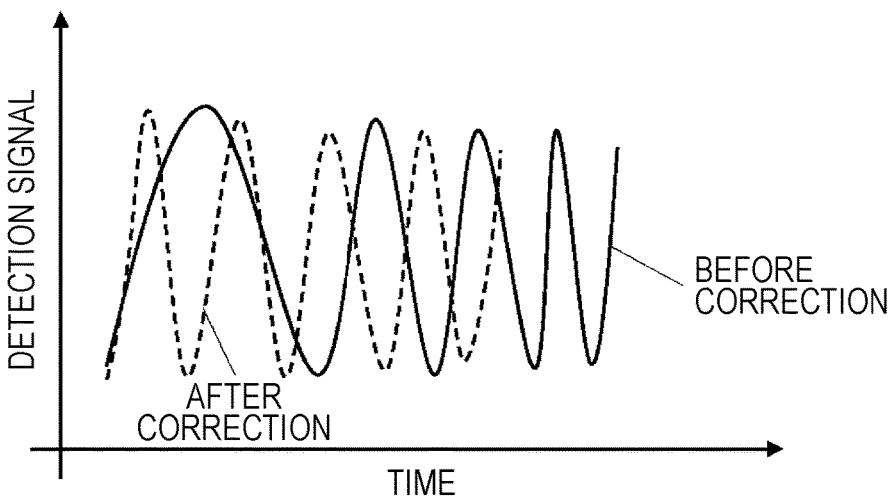
FIG. 19
| FREQUENCY [Hz] | DISTANCE [m] |
|---|---|
| ⋮ | ⋮ |
| $f_i$ | $d_i$ |
| $f_{i+1}$ | $d_{i+1}$ |
| ⋮ | ⋮ |

FIG. 20A

| UP-CHIRP | |
|---|---|
| FREQUENCY [Hz] | DISTANCE [m] |
| . | . |
| . | . |
| . | . |
| $f_i$ | $d1_i$ |
| $f_{i+1}$ | $d1_{i+1}$ |
| . | . |
| . | . |
| . | . |

FIG. 20B

| DOWN-CHIRP | |
|---|---|
| FREQUENCY [Hz] | DISTANCE [m] |
| . | . |
| . | . |
| . | . |
| $f_i$ | $d2_i$ |
| $f_{i+1}$ | $d2_{i+1}$ |
| . | . |
| . | . |
| . | . |

FIG. 21

| FREQUENCY DIFFERENCE [Hz] | VELOCITY [m/s] |
|---|---|
| . | . |
| . | . |
| . | . |
| $fd_i$ | $v_i$ |
| $fd_{i+1}$ | $v_{i+1}$ |
| . | . |
| . | . |
| . | . |

FIG. 23A
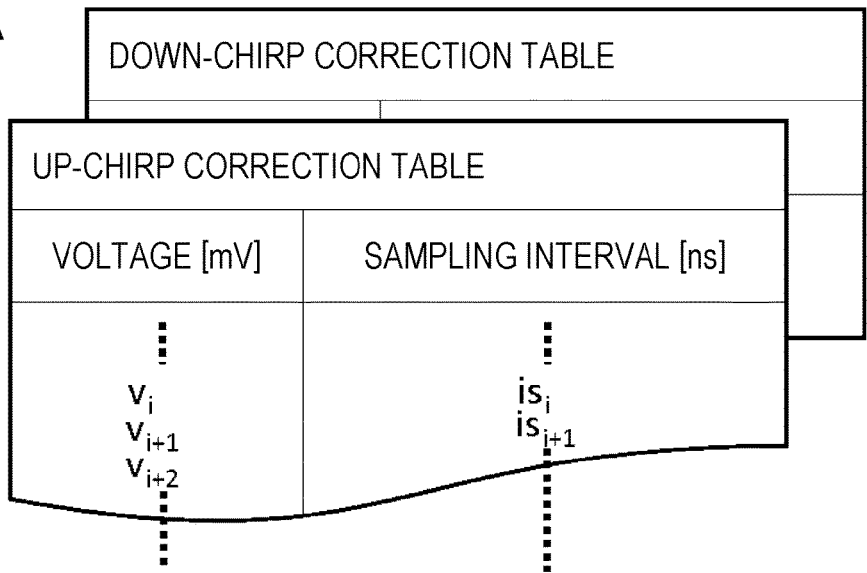
| DOWN-CHIRP CORRECTION TABLE | |
| --- | --- |
| UP-CHIRP CORRECTION TABLE | |
| VOLTAGE [mV] | SAMPLING INTERVAL [ns] |
| $v_i$ $v_{i+1}$ $v_{i+2}$ | $is_i$ $is_{i+1}$ |
FIG. 23B
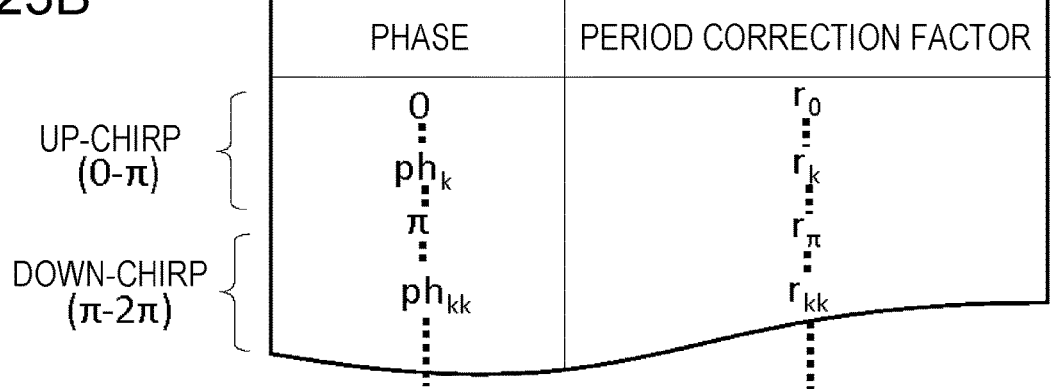
| | PHASE | PERIOD CORRECTION FACTOR |
| --- | --- | --- |
| UP-CHIRP $(0-\pi)$ | $0$ $ph_k$ $\pi$ | $r_0$ $r_k$ $r_\pi$ |
| DOWN-CHIRP $(\pi-2\pi)$ | $ph_{kk}$ | $r_{kk}$ |
FIG. 23C
| PHASE | SAMPLING INTERVAL [ns] |
| --- | --- |
| $0$ $ph_k$ $\pi$ $ph_{kk}$ | $iis_0$ $iis_k$ $iis_\pi$ $iis_{kk}$ |

APPARATUS AND METHOD FOR MEASURING DISTANCE AND/OR VELOCITY OF OBJECT

BACKGROUND

1. Technical Field

The present disclosure relates to an apparatus and a method for measuring the distance and/or velocity of an object.

2. Description of the Related Art

Frequency modulated continuous wave (FMCW) based ranging apparatuses send an electromagnetic wave whose frequency is modulated and measure distance based on the difference in frequency between the sent wave and the reflected wave. An FMCW-based ranging apparatus in which the electromagnetic wave is a radio wave, such as a millimeter wave, is called an FMCW radar. The FMCW radar uses a voltage controlled oscillator (VCO) as an oscillation source of the radio wave, for example. An FMCW-based ranging apparatus in which the electromagnetic wave is light, such as visible light or infrared light, is called an FMCW LiDAR. The FMCW LiDAR uses a laser light source as the light source, for example.

The FMCW LiDAR emits from the light source toward an object, light whose frequency is periodically modulated and causes the reflected light from the object to interfere with the reference light from the light source, thus producing interfering light. The interfering light is detected by a photodetector and is converted to an electric signal. This electric signal includes a signal component having a frequency corresponding to the difference in frequency between the reflected light and the reference light. This signal component is called a "beat signal". The frequency of the beat signal is called "beat frequency". The beat frequency correlates with the distance to the object. The distance to the object can be thus calculated based on the beat frequency. Furthermore, the FMCW LiDAR can calculate the velocity of a moving object using a Doppler shift of the reflected light from the object. For example, the velocity of an object can be calculated based on the difference in frequency between the beat signal of an up-chirp duration in which the frequency of light emitted from the light source increases and the beat signal of a down-chirp duration in which the frequency decreases.

The FMCW LiDAR detects the frequency of the electric signal outputted from the photodetector, unlike a time-of-flight (TOF) LiDAR, and is therefore characterized by the ranging results being less influenced by ambient light. On the other hand, it has been thought that the accuracy of distance measurement by the FMCW LiDAR depends on how linearly the frequency of light can be modulated with respect to time.

International Publication No. 2006/035199 describes that even when the VCO of the FMCW radar receives voltage linearly swept with respect to time, the frequency changes non-linearly, leading to degradation of the ranging performance. To solve this problem, International Publication No. 2006/035199 discloses a method of dynamically changing the timing of sampling of the interfering signal based on a sweep signal obtained from an artificial target. This can compensate the non-linearity of frequency sweep.

Japanese Unexamined Patent Application Publication No. 2014-185973 discloses an FMCW radar apparatus that corrects the frequency of the interfering signal using correction data corresponding to plural distances and plural ambient temperatures. This can improve the detection accuracy.

Japanese Unexamined Patent Application Publication No. 2019-45200 discloses an FMCW LiDAR apparatus example that continually measures the frequency of the beat signal and calculates the distance to an object based on the average between the measured frequencies. This can remove the influence of the non-linear chirp of the laser and implement accurate distance measurement.

SUMMARY

One non-limiting and exemplary embodiment provides a new technique to reduce the performance degradation of the distance and/or velocity measurement due to the difference in non-linearity of frequency change between the up-chirp and the down-chirp.

In one general aspect, the techniques disclosed here feature a measurement apparatus including: a light source emitting light whose frequency is modulated; an interference optical system splitting the light emitted from the light source into reference light and output light and generating interfering light between reflected light resulting from reflection of the output light on an object and the reference light; a photodetector receiving the interfering light and outputting a detection signal corresponding to strength of the interfering light; a processing circuit that modulates the frequency of the light outputted from the light source in a period including an up-chirp duration in which the frequency increases and a down-chirp duration in which the frequency decreases, and based on the detection signal, generates and outputs measurement data concerning distance and/or velocity of the object; and a storage apparatus storing first correction data for the up-chirp duration and second correction data for the down-chirp duration. The processing circuit generates the measurement data, based on a first corrected signal obtained by correcting a part of the detection signal corresponding to the up-chirp duration based on the first correction data and/or a second corrected signal obtained by correcting a part of the detection signal corresponding to the down-chirp duration based on the second correction data.

Comprehensive or specific aspects of the present disclosure may be realized by any one of a system, an apparatus, a method, an integrated circuit, a computer program, and a storage medium such as a computer-readable storage disk, or by any combination of a system, an apparatus, a method, an integrated circuit, a computer program, and a storage medium. Such a computer-readable storage medium may include a volatile storage medium, or a non-volatile storage medium as typified by a CD-ROM (compact disc-read only memory) and the like. The apparatus may be formed from one or more devices. In the case where the apparatus is formed from two or more devices, the two or more devices may be embedded in a single instrument or may be separately embedded in two or more separated instruments. In the present specification and in the appended claims, the term "apparatus" can not only mean a single apparatus, but also mean a system formed from multiple apparatuses.

According to an aspect of the present disclosure, it is possible to improve the performance of distance and/or velocity measurement by performing proper signal correction for one or both of the up-chirp and down-chirp durations.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 17 is a diagram illustrating a screen example displayed by a display apparatus during measurement;

FIG. 18 is a diagram illustrating waveform examples of the detection signal before and after correction;

FIG. 19 is a diagram illustrating a conversion table example that defines the relationship between the beat frequency and distance;

FIG. 20A is a diagram illustrating a conversion table example for up-chirp that defines the relationship between the beat frequency and distance;

FIG. 20B is a diagram illustrating a conversion table example for down-chirp that defines the relationship between the beat frequency and distance;

FIG. 21 is a diagram illustrating a conversion table example that defines the relationship between the frequency difference and velocity;

FIG. 23A is a diagram illustrating another correction table example;

FIG. 23B is a diagram illustrating still another correction table example;

FIG. 23C is a diagram illustrating still another correction table example;

DETAILED DESCRIPTIONS

Underlying Knowledge Forming Basis of the Present Disclosure

The inventors found the following phenomenon with regard to interfering light in FMCW LiDARs. Even when the control voltage of the light source is linearly swept in order to linearly modulate the frequency of light, the frequency of light changes non-linearly. The non-linearity differs between the up-chirp, which is a process of increasing the frequency of light, and the down-chirp, which is a process of decreasing the frequency. Hereinafter, this phenomenon is described with reference to FIGS. 1A to 1C.

Figure 1A:
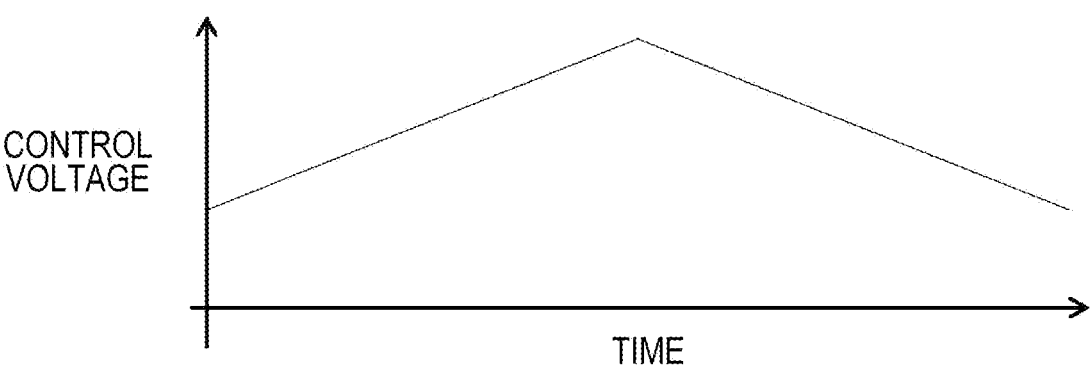
FIG. 1A is a graph illustrating an example of change with time in control voltage applied to a light source.
Figure 1B:
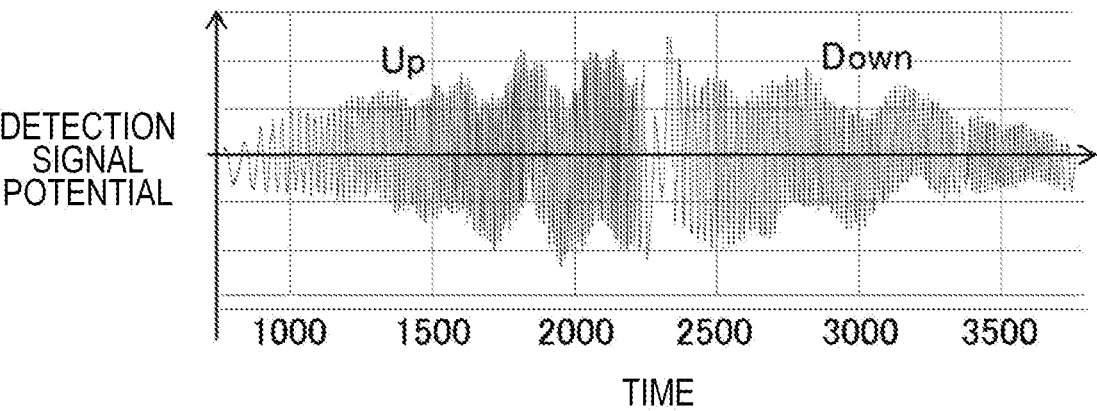
FIG. 1B is a graph illustrating change with time in electric signal obtained by detecting interfering light.
Figure 1C:
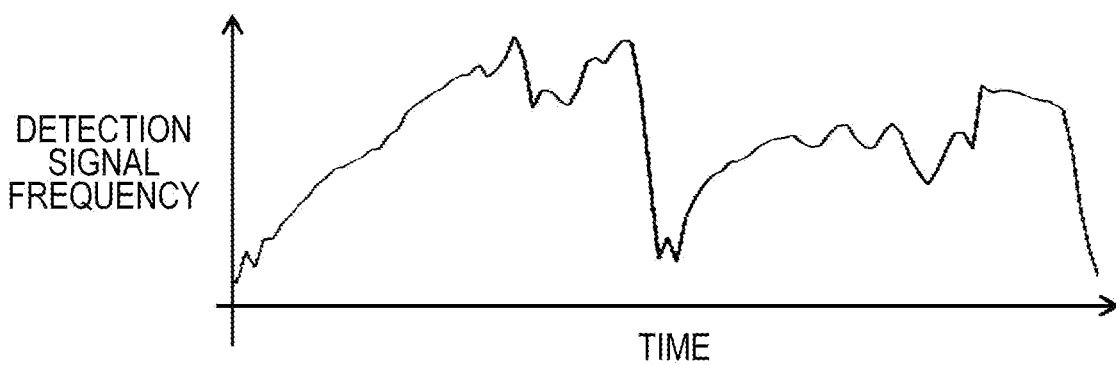
FIG. 1C is a graph illustrating change with time in instantaneous frequency of the interfering wave signal illustrated in FIG. 1B.

FIGS. 1A to 1C illustrate data examples obtained by an experiment performed by the inventors. In this experiment, a semiconductor laser light source placed at a stationary point emitted laser light toward a reflector as a stationary object. The voltage (hereinafter, referred to as control voltage) of a control signal inputted to the light source was linearly swept within a predetermined voltage range and with a predetermined period, causing the light source to emit laser light whose frequency is periodically modulated. Using an interference optical system, reflected light from the reflector was caused to interfere with light emitted from the light source. The resultant interfering light was detected by a photodetector, and the acquired signal was recorded.

FIG. 1A is a graph illustrating an example of change with time within one period in the control voltage applied to the light source. In this experiment, the voltage of the control signal was swept so as to change like a triangular wave as illustrated in FIG. 1A. This control signal includes up-chirp with the voltage increasing from a lower limit to an upper limit and down-chirp with the voltage decreasing from the upper limit to the lower limit. The duration in which the control voltage increases is referred to as an "up-chirp duration", and the duration in which the control voltage decreases is referred to as a "down-chirp duration".

FIG. 1B is a graph illustrating change with time in an electric signal (hereinafter, also referred to as a "detection signal" or an "interfering wave signal") obtained by detecting the interfering light. The graph illustrated in FIG. 1B represents potential change of the interfering wave signal and reflects change in strength of the interfering wave with time.

FIG. 1C illustrates change with time in instantaneous frequency of the interfering wave signal illustrated in FIG. 1B. The instantaneous frequency is obtained by a frequency analysis for the waveform illustrated in FIG. 1B. This frequency is referred to as "beat frequency".

In the graphs illustrated in FIGS. 1A to 1C, the horizontal axes represent the same period of time. Each graph illustrates change in signal within one period of the control voltage. Hereinafter, the period of the control voltage is sometimes referred to as a "modulation period".

In this experiment, the stationary object was irradiated with light from the stationary point. Therefore, if the frequency of light was linearly swept in response to the linear sweep of the control voltage, the frequency of the interfering wave signal, that is, the beat frequency was supposed to be consistent except a very short period of time in which the up-chirp duration switches to the down-chirp duration. However, the experiment results revealed that the beat frequency was not consistent neither in the up-chirp duration nor in the down-chirp duration and furthermore differently changed in the up-chirp duration and the down-chirp duration. As illustrated in FIG. 1C, in the up-chirp duration, the frequency of the interfering wave increases gradually to a certain frequency and then repeatedly increases and decreases. In the down-chirp duration, the frequency of the interfering wave increases rapidly and then repeatedly increases and decreases so as not to exceed the frequency in the up-chirp duration, followed by a steep decrease. In such a manner, the interfering wave exhibits non-linear change against both the control voltage and time in both of the up-chirp and the down-chirp. The non-linearity of the frequency of the interfering wave against the control voltage and time depends on the laser element used as a light source and its operation condition. Such a phenomenon is thought to occur because of the following reason. Heat given to the laser element by the current driving the laser element changes differently with time depending on the manner that the control voltage changes. Such a difference in changing manner affects changes with time in the resonator length, gain curve, and oscillation mode of the laser element, causing a variation in change in oscillation frequency of the laser.

When the beat frequency fluctuates against the control voltage or time and the non-linearity of frequency modulation differs in the up-chirp and down-chirp in such a manner, the distance and velocity of an object cannot be uniquely determined. In order to reduce the fluctuation in beat frequency, the spectrum obtained by a frequency analysis may be integrated (or averaged) over the control voltage or time. However, such integration increases the spectrum width of the beat signal. This makes it difficult to determine the peak frequency of the beat signal, leading to degradation in accuracy of distance and velocity measurement.

As described above, it was revealed that the FMCW LiDAR involved the aforementioned problems. In order to solve the aforementioned problems, the inventors have devised the configuration of an embodiment of the present disclosure described below. The inventors have conceived that the accuracy of distance and/or velocity measurement can be improved by preparing different correction data for the up-chirp duration and the down-chirp duration and using these correction data to correct the detection signal of the interfering wave in the process of measurement. Hereinafter, an exemplary embodiment of the present disclosure is described.

A measurement apparatus according to an embodiment of the present disclosure includes a light source; an interference optical system; a photodetector; a processing circuit; and a storage apparatus. The light source emits light whose frequency is modulated. The interference optical system splits the light emitted from the light source into reference light and output light and generates interfering light between reflected light resulting from reflection of the output light on an object and the reference light. The photodetector receives the interfering light and outputs a detection signal corresponding to strength of the interfering light. The processing circuit modulates the frequency of the light outputted from the light source in a period including an up-chirp duration in which the frequency increases and a down-chirp duration in which the frequency decreases, and based on the detection signal, generates and outputs measurement data concerning distance and/or velocity of the object. The storage apparatus stores first correction data for the up-chirp duration and second correction data for the down-chirp duration. The processing circuit generates the measurement data, based on a first corrected signal obtained by correcting a part of the detection signal corresponding to the up-chirp duration based on the first correction data and/or a second corrected signal obtained by correcting a part of the detection signal corresponding to the down-chirp duration based on the second correction data.

According to the aforementioned configuration, the detection signal is corrected based on the different correction data for the up-chirp duration and the down-chirp duration. This can reduce degradation of the measurement performance due to a difference in non-linearity of frequency change between the up-chirp and the down-chirp.

The processing circuit may determine frequency of the first corrected signal and frequency of the second corrected signal, may determine distance from the measurement apparatus to the object based on the frequency of the first corrected signal and the frequency of the second corrected signal, and may generate the measurement data including information on the distance. For example, the processing circuit may calculate the average between the frequency of the first corrected signal and the frequency of the second corrected signal and determine the distance to the object based on the calculated average. This operation implements more accurate distance measurement. The storage apparatus can previously store data such as a table or a function that defines the correspondence relationship between the frequency and distance. The processing circuit can determine the distance from the frequency based on the stored data.

The processing circuit may determine frequency of the first corrected signal and frequency of the second corrected signal, and may determine velocity of the object based on a difference between the frequency of the first corrected signal and the frequency of the second corrected signal and generate the measurement data including information on the velocity. This operation implements more accurate measurement of the velocity of the object. The storage apparatus can previously store data such as a table or a function that defines the correspondence relationship between the velocity and the difference between the frequency of the first corrected signal and the frequency of the second corrected signal. The processing circuit can determine the velocity from the difference in frequency based on the stored data.

The processing circuit may change the frequency of the light emitted from the light source by changing control voltage to be applied to the light source. The first correction data and the second correction data may be data of a table or a function that defines correspondence relationship between the control voltage and a correction value. The processing circuit may correct the detection signal based on the correction value corresponding to the control voltage. Such an operation can reduce the influence of the non-linearity of frequency modulation that changes with the value of the control voltage, thus improving the performance of distance and/or velocity measurement.

The correction value may be a coefficient to correct the period of the detection signal, for example. In such a case, the processing circuit can determine the period from the detection signal and correct the period by multiplying the period by the correction value. Use of the detection signal corrected in such a manner can improve the performance of distance and/or velocity measurement.

The first correction data may be data of a table or a function that defines the correspondence relationship between the control voltage and the correction value in a first time period as a part of the up-chirp duration. The second correction data may be data of a table or a function that defines the correspondence relationship between the control voltage and the correction value in a second time period as a part of the down-chirp duration. The processing circuit may extract from the detection signal, a first signal corresponding to the first time period and a second signal corresponding to the second time period, may generate the first corrected signal by correcting the first signal based on the correction value in the first correction data, and may generate the second corrected signal by correcting the second signal based on the correction value in the second correction data. As the first and second time periods, time periods in which the signal changes comparatively stably can be selected, for example. By extracting only a certain time period in which the signal changes comparatively stably from each of the up-chirp duration and down-chirp duration for signal correction in such a manner, more accurate measurement can be implemented.

The interference optical system may be configured to split the light emitted from the light source into the output light, first reference light as the reference light, and second reference light. The measurement apparatus may further include a measurement device that measures wavelength or frequency of the second reference light. The first correction data and the second correction data may be data of a table or a function that defines correspondence relationship between the wavelength or the frequency of the second reference light and a correction value. Since the control voltage correlates with the frequency and wavelength of light emitted from the light source, the correction value can be determined based on the frequency or wavelength of the emitted light instead of the control voltage. Such an operation can provide the same effect as that when the correction value is determined based on the control voltage.

The first correction data may be data of a table or a function that defines the correspondence relationship between the wavelength or the frequency of the second reference light and the correction value in a first time period as a part of the up-chirp duration. The second correction data may be data of a table or a function that defines the correspondence relationship between the wavelength or the frequency of the second reference light and the correction value in a second time period as a part of the down-chirp duration. The processing circuit may extracts from the detection signal, a first signal corresponding to the first time period and a second signal corresponding to the second time period, may generate the first corrected signal by correcting the first signal based on the correction value in the first correction data, and may generate the second corrected signal by correcting the second signal based on the correction value in the second correction data. As the first and second time periods, time periods in which the signal changes comparatively stably can be selected, for example. By extracting only a certain time period in which the signal changes comparatively stably from each of the up-chirp duration and down-chirp duration for signal correction in such a manner, more accurate measurement can be implemented.

The processing circuit may cause the light source to emit the light in which a period of frequency modulation is consistent. The first correction data and the second correction data may be data of a table or a function that defines correspondence relationship between a phase in the period of the frequency modulation and a correction value. Alternatively, the first correction data and the second correction data may be data of a table or a function that defines correspondence relationship between time from a reference point of time in frequency modulation of the light source and a correction value.

The first correction data and the second correction data may be data of a table or a function that includes information on a correction value to alter timing of sampling of the detection signal. The processing circuit can correct the detection signal by determining the timing of sampling of the detection signal in accordance with the correction value.

A method according to another embodiment of the present disclosure is executed by a computer in a system including a measurement apparatus. The measurement apparatus includes: a light source emitting light whose frequency is modulated in a period including an up-chirp duration in which the frequency increases and a down-chirp duration in which the frequency decreases; an interference optical system splitting the light emitted from the light source into reference light and output light and generating interfering light between reflected light resulting from reflection of the output light on an object and the reference light; a photo-detector receiving the interfering light and outputting a detection signal corresponding to strength of the interfering light; and a storage apparatus storing first correction data for the up-chirp duration and second correction data for the down-chirp duration. The method includes: generating a first corrected signal by correcting a part of the detection signal corresponding to the up-chirp duration based on the first correction data and/or a second corrected signal by correcting a part of the detection signal corresponding to the down-chirp duration based on the second correction data; and generating and outputting measurement data concerning distance and/or velocity based on the first corrected signal and/or the second corrected signal.

A non-transitory computer-readable medium according to still another embodiment of the present disclosure has a computer program executed by a computer in a system including a measurement apparatus. The measurement apparatus includes: a light source emitting light whose frequency is modulated in a period including an up-chirp duration in which the frequency increases and a down-chirp duration in which the frequency decreases; an interference optical system splitting the light emitted from the light source into reference light and output light and generating interfering light between reflected light resulting from reflection of the output light on an object and the reference light; a photodetector receiving the interfering light and outputting a detection signal corresponding to strength of the interfering light; and a storage apparatus storing first correction data for the up-chirp duration and second correction data for the down-chirp duration. The computer program causes the computer to execute operations including: generating a first corrected signal by correcting a part of the detection signal corresponding to the up-chirp duration based on the first correction data and/or a second corrected signal by correcting a part of the detection signal corresponding to the down-chirp duration based on the second correction data; and generating and outputting measurement data concerning distance and/or velocity based on the first corrected signal and/or the second corrected signal.

In the present disclosure, all or part of circuits, units, apparatuses, members or portions, or all or part of functional blocks in block diagrams can be implemented by one or more electronic circuits including semiconductor devices, semiconductor integrated circuits (IC), or LSI (large scale integration), for example. The LSI or the IC may be integrated into one chip or formed by a combination of multiple chips. For example, functional blocks other than a storage apparatus may be integrated into one chip. Although it is referred to as the LSI or the IC herein, the name may be changed according to the degree of integration thereof, and a device called system LSI, VLSI (very large scale integration), or ULSI (ultra large scale integration) is also acceptable. A field programmable gate array (FPGA) to be programmed after manufacturing the LSI, or a reconfigurable logic device that enables reconfiguration of junction relations inside the LSI or set-up of circuit compartments inside the LSI can also be used for the same purpose.

In addition, functions or operations of all or part of the circuits, the units, the members or the portions can be executed by software processing. In this case, the software is stored in non-transitory storage media such as one or more ROMs, optical disks, and hard disk drives. When the software is executed by a processor, a function specified by the software is executed by the processor (processor) and a peripheral device. A system or an apparatus may include one or more non-transitory storage media storing the software, the processor (processor), and a required hardware device such as an interface.

Hereinafter, an exemplary embodiment of the present disclosure is specifically described. The embodiment described below represents a comprehensive or a specific example. Numerical values, shapes, constituent components, locations and connections of the constituent components, steps, the order of steps, display screen layouts, and like, which are illustrated in the following embodiment, are shown by way of example and do not intend to limit the present disclosure. A constituent component, among the constituent components of the following embodiment, that is not described in an independent claim representing the most generic concept is explained as an optional constituent component. Each drawing is schematic and is not always precise illustration. Furthermore, in each drawing, the same or similar constituent components are given the same reference numerals. The redundant description may be omitted or simplified.

Embodiment 1

A measurement apparatus according to an exemplary first embodiment of the present disclosure is described. The measurement apparatus according to the embodiment is a ranging apparatus measuring the distance to an object by using an FMCW-LiDAR technique. The measurement apparatus may measure the velocity of the object in addition to or instead of the distance. The measurement apparatus can be mounted in a moving object, such as an autonomous car, an automated guided vehicle (AGV), an unmanned aerial vehicle (UAV), or a mobile robot, for example. The measurement apparatus can be mounted and used in any device, not limited to a moving object.

Configuration

Figure 2:
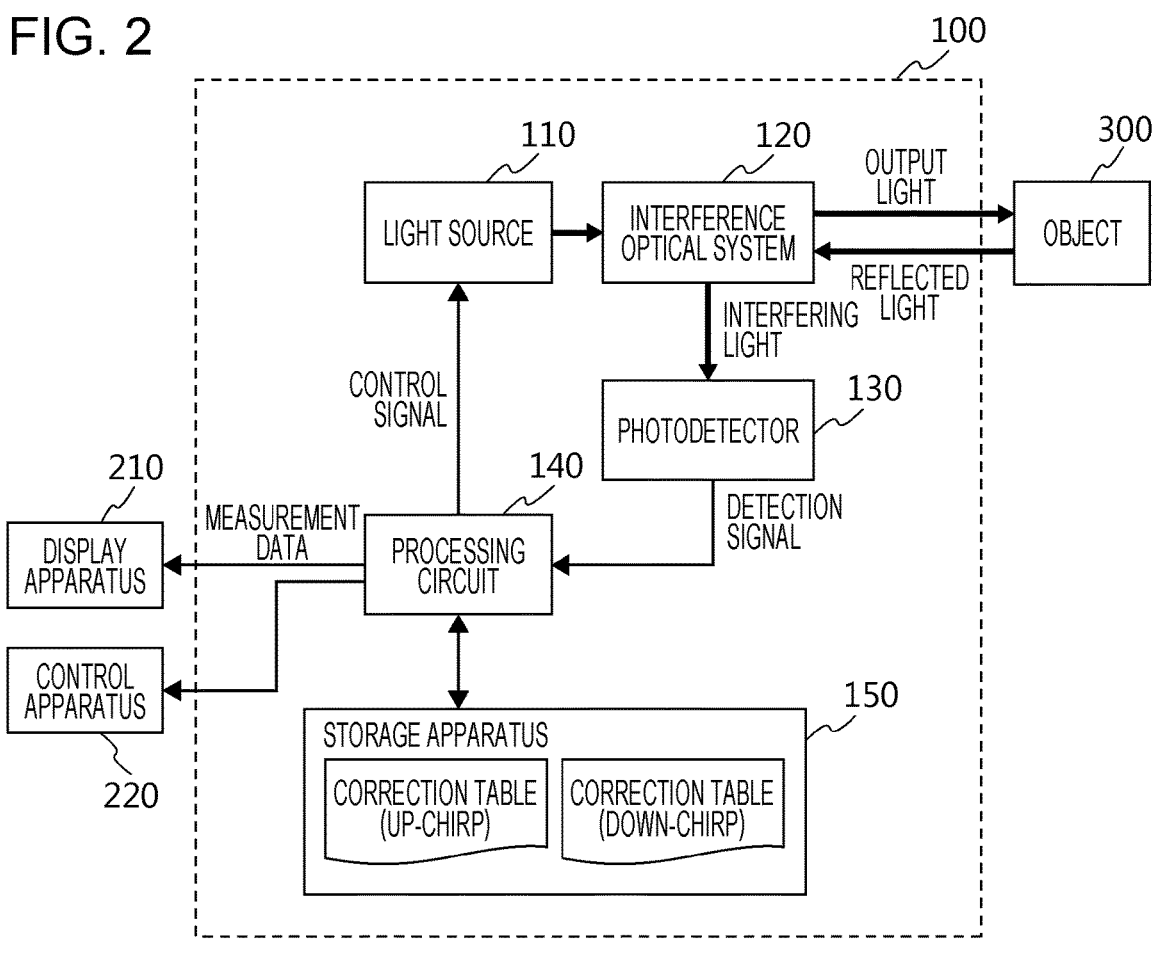
FIG. 2 is a block diagram illustrating a schematic configuration of a measurement apparatus 100 according to Embodiment 1.

FIG. 2 is a block diagram illustrating a schematic configuration of a measurement apparatus 100 according to the embodiment. In FIG. 2, thick arrows represent flows of light, and thin arrows represent flows of signals or data. FIG. 2 also illustrates an object 300, which is a target whose distance and/or velocity is to be measured, and a display apparatus 210 and a control apparatus 220, which are coupled to the measurement apparatus 100. The object 300 is any object, for example, such as an obstacle, a man, or a moving object (an automobile, a motorcycle, a moving robot, or a drone, for example).

The measurement apparatus 100 illustrated in FIG. 2 includes a light source 110, an interference optical system 120, a photodetector 130, a processing circuit 140, and a storage apparatus 150. The light source 110 is able to change the frequency of light emitted, in response to a control signal outputted from the processing circuit 140. The interference optical system 120 splits the light emitted from the light source 110 into reference light and output light and generates interfering light by causing reflected light resulting from reflection of the output light on the object 300 to interfere with the reference light. The interfering light enters the photodetector 130. The detailed configurations of the light source 110 and the interference optical system 120 are described later.

The photodetector 130 receives the interfering light, generates an electric signal corresponding to the strength of the received interfering light, and outputs the generated electric signal. This electric signal is referred to as a "detection signal" or an "interfering wave signal". The photodetector 130 includes one or more light receiving elements. The light receiving elements include a photoelectric conversion element, such as a photodiode, for example. The photodetector 130 may be a sensor including plural light receiving elements, such as an image sensor, for example.

The processing circuit 140 is an electronic circuit to control the light source 110 and perform processing based on the detection signal outputted from the photodetector 130. The processing circuit 140 can include a control circuit controlling the light source 110 and a signal processing circuit performing signal processing based on the detection signal. The processing circuit 140 may be composed of one circuit or may be an aggregate of plural separate circuits. The processing circuit 140 sends a control signal to the light source 110. The control signal causes the light source 110 to periodically change the frequency of emitted light in a predetermined range. In other words, the control signal is a signal to sweep the frequency of light emitted from the light source 110. The control signal is a signal to input to the light source 110, voltage periodically changing with a certain amplitude. The processing circuit 140 acquires the detection signal outputted from the photodetector 130 while the light source 110 is emitting the frequency-modulated light. The processing circuit 140 corrects the acquired detection signal based on correction data stored in the storage apparatus 150. The processing circuit 140 determines the distance to the object 300 and/or the velocity of the object 300 based on the corrected detection signal. The processing circuit 140 generates and outputs data indicating the distance and/or velocity. These data are referred to as "measurement data".

The storage apparatus 150 includes any storage medium, such as a semiconductor memory, a magnetic memory, or an optical disk, for example. The storage apparatus 150 stores correction data for use in the correction processing executed by the processing circuit 140. The correction data of the embodiment include a first correction table for an up-chirp duration and a second correction table for a down-chirp duration. The up-chirp duration is a duration in which the voltage of the control signal monotonically increases and the frequency of light emitted from the light source 110 increases. The down-chirp duration is a duration in which the voltage of the control signal monotonically decreases and the frequency of light emitted from the light source 110 decreases. The first correction table is used to correct a part of the detection signal of the interfering light obtained from light emitted in the up-chirp duration. The second correction table is used to correct a part of the detection signal of the interfering light obtained from light emitted in the down-chirp duration. Each correction table defines the correspondence relationship between the operation state of the light source 110 and correction values, for example. These correction tables are described in detail later. Each correction table is an example of the correction data. The correction data is not limited to correction tables and may be data in any form, such as a function defining the correspondence relationship between the operation state of the light source 110 and correction values of the detection signal. The storage apparatus 150 stores a computer program executed by the processing circuit 140.

The processing circuit 140 and the storage apparatus 150 may be integrated in one circuit substrate or may be provided for different circuit substrates. The functions of the processing circuit 140 may be distributed to multiple circuits. At least some of the functions of the processing circuit 140 may be implemented by an external computer installed in a distant location from the other constituent components. Such an external computer may execute through a wired or wireless communication network, control of the operation of the light source 110 and the photodetector 130 or signal processing based on the detection signal outputted from the photodetector 130.

For distance and/or velocity measurement of the object 300, the processing circuit 140 executes the following operations:

Sending the control signal to the light source 110 to cause the light source 110 to emit light whose frequency is modulated in a period including the up-chirp duration, in which the frequency increases, and the down-chirp duration, in which the frequency decreases;

Correcting the waveform of the detection signal based on the first correction table for the up-chirp and the second correction table for the down-chirp that are stored in the storage apparatus 150;

Determining the beat frequency of each of the up-chirp duration and the down-chirp duration by a frequency analysis based on the corrected waveform;

Determining the distance to the object 300 based on the beat frequency of at least one of the up-chirp duration and the down-chirp duration;

Determining the velocity of the object 300 based on the difference between the beat frequencies of the up-chirp duration and the down-chirp duration; and Outputting measurement data including information on the distance and velocity.

The measurement data are outputted to the display apparatus 210, for example. When the measurement apparatus 100 is mounted on a moving object, the measurement data may be outputted to the control apparatus 220, which controls the operation (steering, velocity, or the like, for example) of the moving object. The measurement data can be recorded in the storage apparatus 150 or an external storage apparatus.

The display apparatus 210 displays the distance and/or velocity based on the measurement data. The display apparatus 210 is a display that displays numeral values or graphs, for example. Instead of or in addition to the display apparatus 210, the measurement data may be outputted to an output device, such as a speaker that outputs voice reading numerical values or a printer that prints numerical values or graphs.

Next, more detailed configuration examples of the light source 110 and the interference optical system 120 are described.

Figure 3:
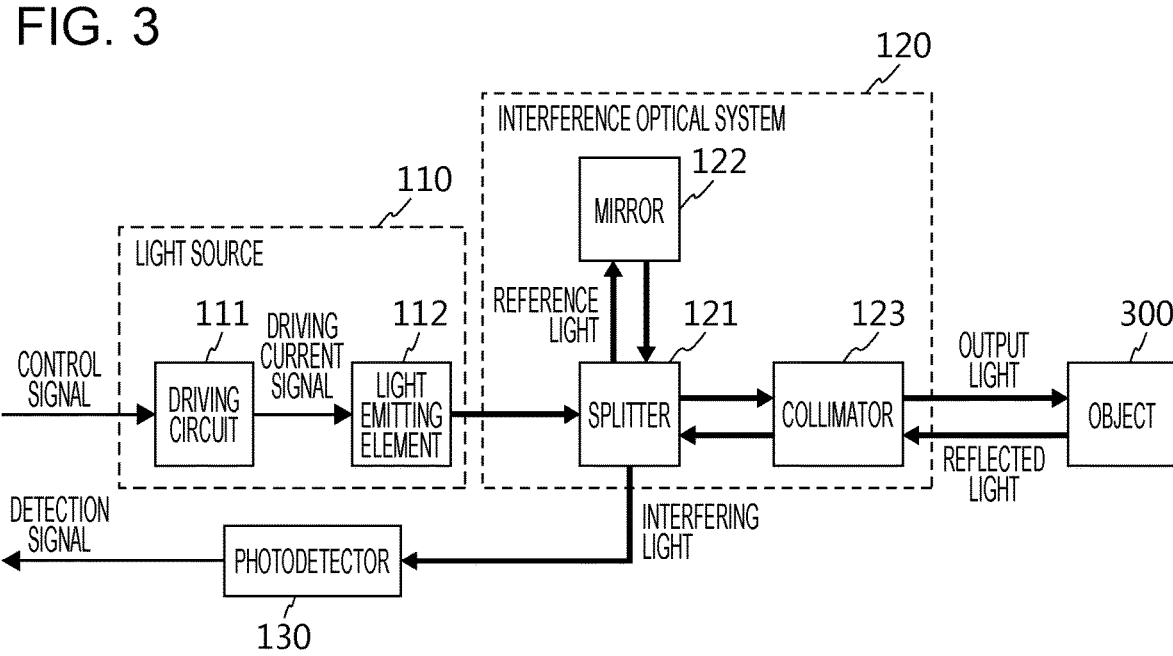
FIG. 3 is a block diagram illustrating configuration examples of a light source and an interference optical system.

FIG. 3 is a block diagram illustrating configuration examples of the light source 110 and the interference optical system 120. The light source 110 in this example includes a driving circuit 111 and a light emitting element 112. The driving circuit 111 receives the control signal outputted from the processing circuit 140 and generates a driving current signal corresponding to the received control signal. The driving circuit 111 then inputs the driving current signal to the light emitting element 112. The light emitting element 112 can be an element emitting highly-coherent laser light, such as a semiconductor laser element, for example. The light emitting element 112 emits laser light whose frequency is modulated in response to the driving current signal.

The frequency of laser light emitted from the light emitting element 112 is modulated in a constant period. The period of frequency modulation can be longer than or equal to one microsecond ($\mu$s) and shorter than or equal to 10 milliseconds (ms), for example. The frequency modulation range can be greater than or equal to 100 MHz and less than or equal to 1 THz, for example. The wavelength of the laser light can be within the range of near-infrared wavelengths longer than or equal to 700 nm and shorter than or equal to 2000 nm, for example. Sunlight includes a smaller amount of near-infrared light than that of visible light. Using near-infrared light as the laser light can therefore reduce the influence of sunlight. For some uses, the wavelength of the laser light may be within the range of visible wavelengths longer than or equal to 400 nm and shorter than or equal to 700 nm or within the range of ultraviolet wavelengths.

Figure 4:
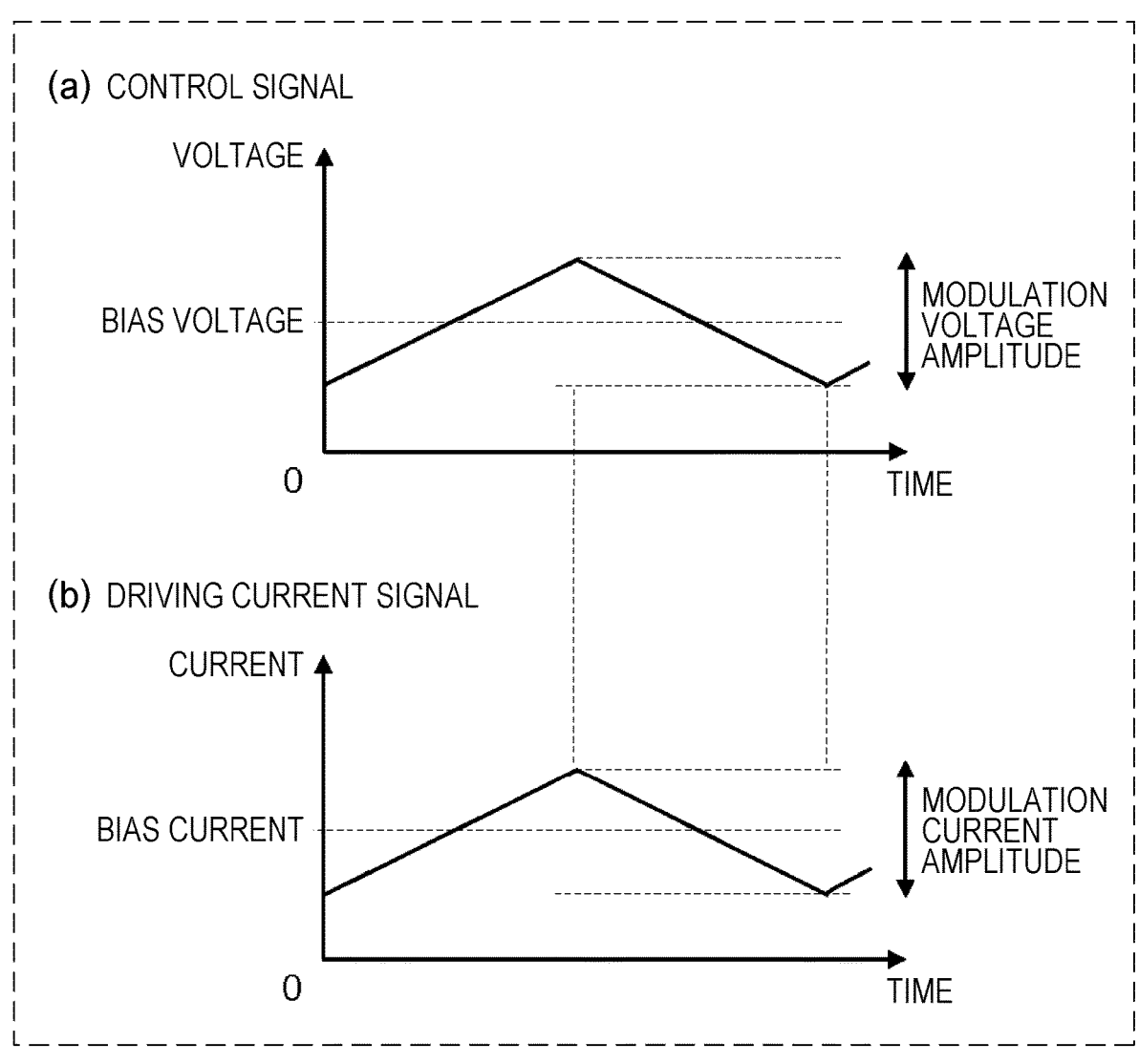
FIG. 4 is a diagram illustrating a control signal example outputted from a processing circuit and a driving current signal example outputted from a driving circuit.

FIG. 4 is a diagram illustrating examples of the control signal outputted from the processing circuit 140 and the driving current signal outputted from the driving circuit 111. Part (a) and part (b) of FIG. 4 illustrate waveform examples of the control signal and the driving current signal, respectively. The control signal applies voltage changing with a predetermined period and a predetermined amplitude to the driving circuit 111 of the light source 110. As illustrated in part (a) of FIG. 4, for example, the voltage of the control signal can be modulated like a triangular wave. The voltage of the control signal may be modulated like a sawtooth wave, not limited to a triangular wave. By the control signal with the voltage linearly changing repeatedly like a triangular or sawtooth wave, the frequency of light emitted from the light emitting element 112 can be swept near-linearly. However, as previously described, the frequency cannot be swept completely linearly. The amplitude of such a modulated waveform of the control signal is referred to as modulation voltage amplitude, and the voltage at the center of the modulation range is referred to as a bias voltage. The control signal applies voltage increasing and decreasing around the bias voltage to the driving circuit 111 of the light source 110.

The driving circuit 111 converts the control signal into the driving current signal and drives the light emitting element 112 with the driving current signal. As illustrated in part (b) of FIG. 4, the driving current signal changes in a waveform corresponding to the control signal. The modulation range, that is, the amplitude of the driving current signal is referred to as modulation current amplitude, and the current at the center of the modulation range is referred to as a bias current. As the voltage of the control signal increases, the driving current signal increases, and the frequency of the laser light emitted from the light emitting element 112 increases (that is, the wavelength decreases). On the other hand, the voltage of the control signal decreases, the driving current signal decreases, and the frequency of laser light emitted from the light emitting element 112 decreases (that is, the wavelength increases).

The interference optical system 120 in the example illustrated in FIG. 3 includes a splitter 121, a mirror 122, and a collimator 123. The splitter 121 splits the laser light emitted from the light emitting element 112 of the light source 110 into reference light and output light and generates interfering light by coupling the reflected light from the object 300 and the reference light. The mirror 122 reflects the reference light back to the splitter 121. The collimator 123 includes a collimate lens. The collimator 123 makes the output light nearly collimated to have a spread angle and irradiates the object 300 with the light. The interference optical system 120 is not limited to the configuration illustrated in FIG. 3 and may be a fiber optical system, for example. In this case, the splitter 121 can be a fiber coupler. The reference light is not necessarily reflected on the mirror 122 and may be returned to the splitter 121 by routing of an optical fiber, for example.

Figure 5:
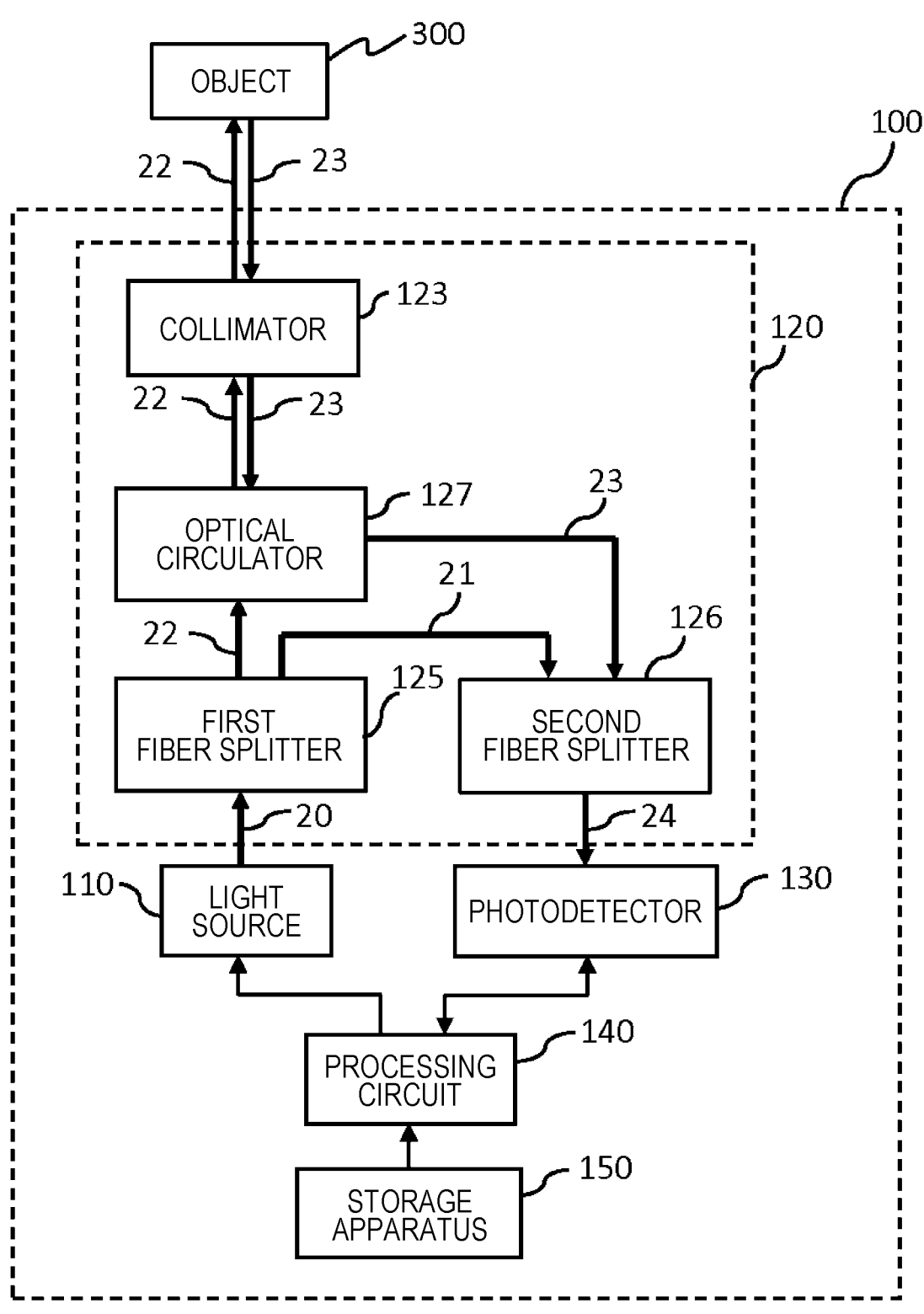
FIG. 5 is a block diagram illustrating a configuration example of a measurement apparatus in which the interference optical system is a fiber optical system.

FIG. 5 is a block diagram illustrating a configuration example of the measurement apparatus 100 with the interference optical system 120 being a fiber optical system. In the example illustrated in FIG. 5, the interference optical system 120 includes a first fiber splitter 125, a second fiber splitter 126, and an optical circulator 127. The first fiber splitter 125 splits laser light 20, which is emitted from the light source 110, into reference light 21 and output light 22. The first fiber splitter 125 allows the reference light 21 to enter the second fiber splitter 126 and allows the output light 22 to enter the optical circulator 127. The optical circulator 127 allows the output light 22 to enter the collimator 123. The optical circulator 127 also allows reflected light 23, which results from irradiation of the object 300 with the output light 22, to enter the second fiber splitter 126. The second fiber splitter 126 allows interfering light 24 between the reference light 21 and reflected light 23 to enter the photodetector 130. The collimator 123 modifies the beam shape of the output light 22 and emits the output light 22 toward the object 300.

Figure 6:
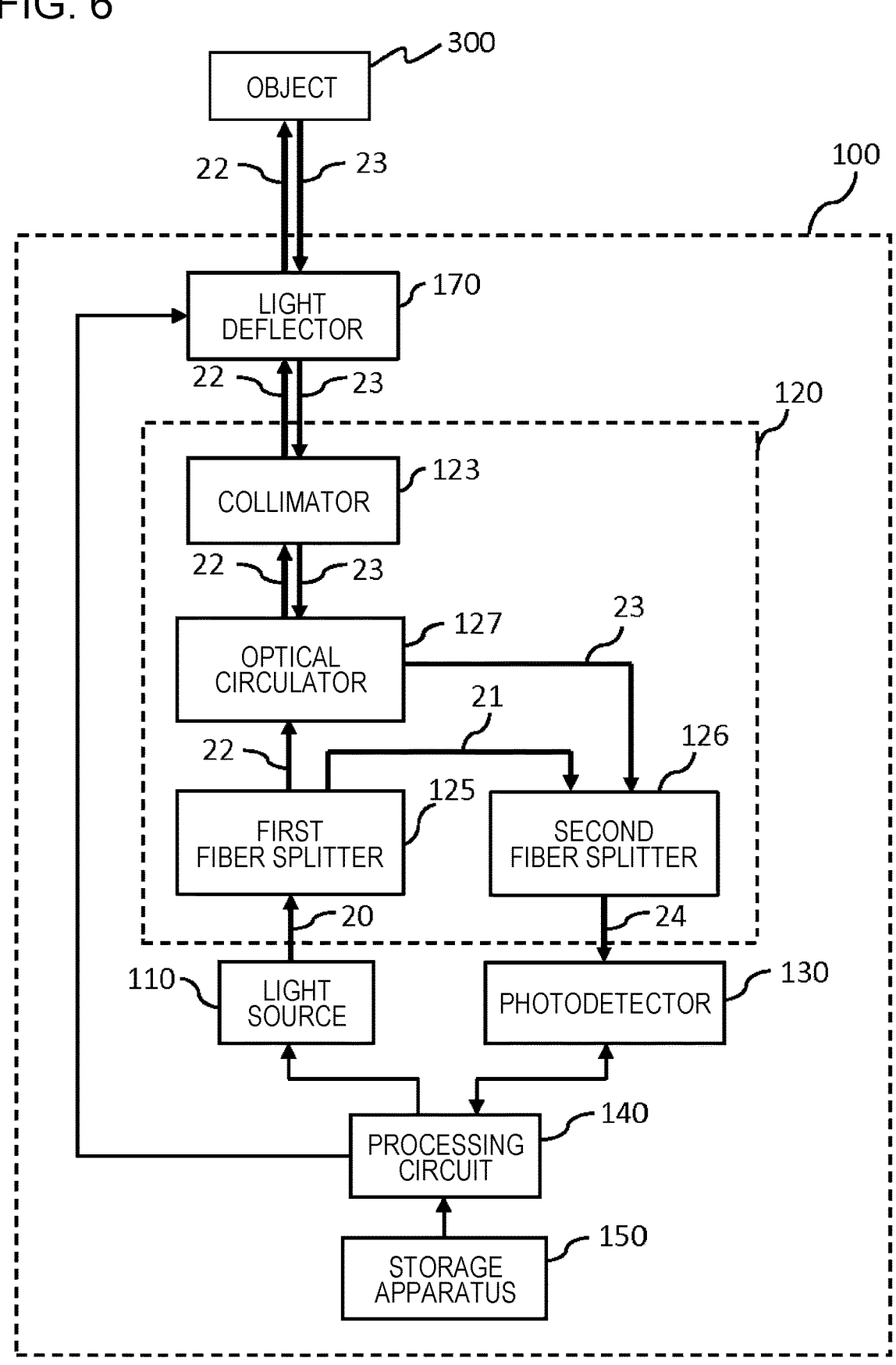
FIG. 6 is a block diagram illustrating a measurement apparatus example including a light deflector.

The measurement apparatus 100 may further include a light deflector that changes the direction of the emitted light. FIG. 6 is a block diagram illustrating an example of the measurement apparatus 100 including a light deflector 170. The light deflector 170 can include a microelectromechanical system (MEMS) mirror or a galvanometer mirror, for example. The light deflector 170 changes the angle of the mirror in accordance with an instruction from the processing circuit 140 to change the direction of emission of the output light 22. This can implement distance measurement in a wide range with beam scanning. The light deflector 170 is not limited to the aforementioned configuration and may be a beam scan device using an optical phased array and a slow light waveguide, as described in International Publication No. 2019/130720, for example.

Figure 7A:
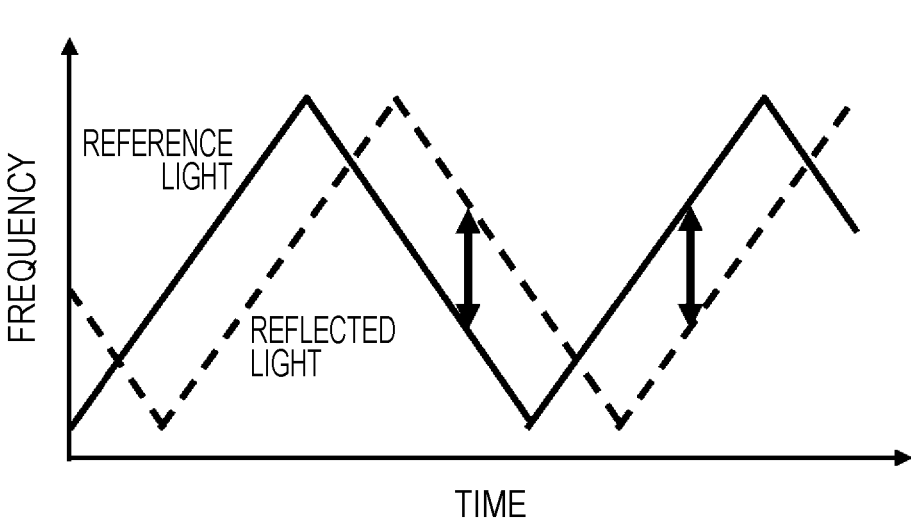
FIG. 7A is a diagram schematically illustrating an example of change with time in frequencies of reference light and reflected light when an object is at rest.
Figure 7B:
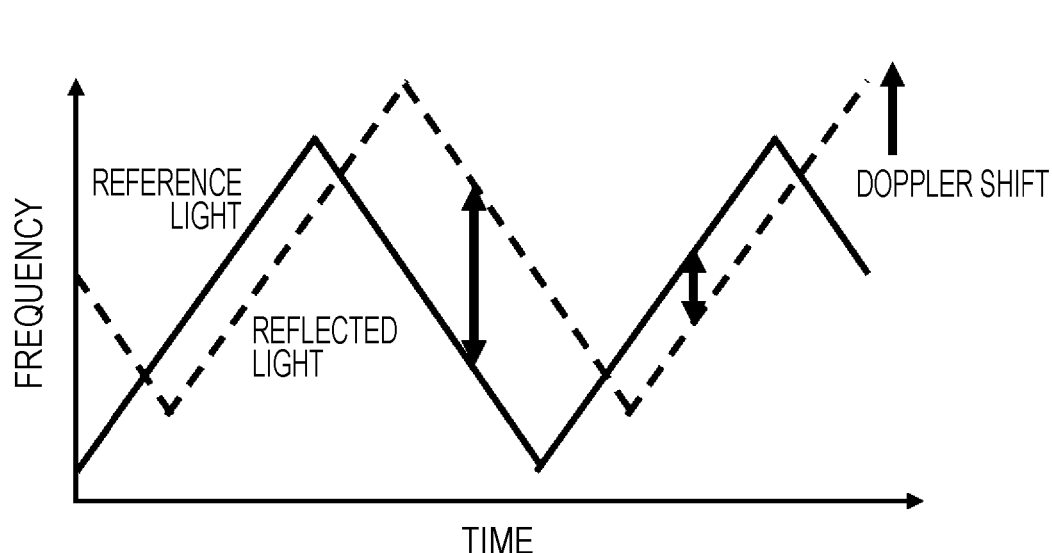
FIG. 7B is a diagram schematically illustrating change with time in frequencies of the reference light and reflected light when an object is moving toward the measurement apparatus 100.

Next, with reference to FIGS. 7A and 7B, the FMCW-LiDAR technique used in the embodiment is described briefly.

FIG. 7A is a diagram schematically illustrating examples of change with time in frequency of the reference light and reflected light when the object 300 is at rest. Herein, the description is given of an example where the frequency changes like a triangular wave. In FIG. 7A, solid lines indicate reference light, and dashed lines indicate reflected light. In one period, the frequency of the reference light illustrated in FIG. 7A increases linearly and then decreases linearly by the increase. Compared to the frequency of the reference light, the frequency of the reflected light is shifted along the time axis by the time taken for the output light to be emitted from the measurement apparatus 100, reflected on the object 300, and then return to the measurement apparatus 100. The interfering light between the reference light and the reflected light has a frequency corresponding to the difference in frequency between the reflected light and the reference light. The double-headed arrows illustrated in FIG. 7A indicate the difference in frequency between the reflected light and the reference light. The photodetector 130 outputs a signal indicating the strength of the interfering light. The outputted signal is referred to as a beat signal. The frequency of the beat signal, that is, the beat frequency is equal to the aforementioned difference in frequency. The processing circuit 140 is able to calculate the distance from the measurement apparatus 100 to the object 300 based on the beat frequency.

FIG. 7B is a diagram schematically illustrating change with time in frequency of the reference light and reflected light when the object 300 moves toward the measurement apparatus 100. When the object 300 moves toward the measurement apparatus 100, the frequency of the reflected light is shifted higher along the frequency axis compared to that when the object 300 is at rest, due to Doppler shift. The amount by which the frequency of the reflected light shifts depends on the magnitude of the component in the direction of the reflected light, of a velocity vector of a certain part of the object 300. The beat frequency varies on whether the frequencies of the reference light and reflected light increase linearly or decrease linearly. In the example illustrated in FIG. 7B, the beat frequency when the frequencies of the reference light and reflected light decrease linearly is higher than that when both the frequencies increase linearly. The processing circuit 140 is able to calculate the velocity of the object 300 based on the difference between the beat frequencies. When the object 300 moves away from the measurement apparatus 100, the frequency of the reflected light is shifted lower along the frequency axis compared to that when the object 300 is at rest. The processing circuit 140 is also able to calculate the velocity of the object 300 based on the difference in beat frequency between when the frequencies of the reference light and reflected light increase linearly and when the frequencies of the reference light and reflected light decrease linearly.

Operation

Hereinafter, the operation of the measurement apparatus 100 of the embodiment is described.

The operation of the measurement apparatus 100 of the embodiment is separated into two major processes of (1) calibration and (2) measurement. Calibration is performed by manufacturer staff (hereinafter, referred to as an "operator") before shipment of the measurement apparatus 100, for example. Ranging is mainly performed by the user of the measurement apparatus 100.

In the calibration, the correction table for the up-chirp and the correction table for the down-chirp are generated and recorded in the storage apparatus 150. The calibration operation is summarized as follows:

While the measurement apparatus 100 is at rest, the light source 110 emits laser light toward a stationary object. The laser light is controlled by the control voltage having a triangular waveform as illustrated in FIG. 4, for example.

The photodetector 130 detects the interfering light between the reflected light from the object and the reference light and outputs a detection signal.

Based on the detection signal, the processing circuit 140 generates a correction table to correct the detection signal so that the frequency of the spectral peak of the interfering light in the up-chirp duration and the frequency of the spectral peak of the interfering light in the down-chirp duration correspond to the distance to the object regardless of the magnitude of the control voltage. The processing circuit 140 then records the generated correction table in the storage apparatus 150.

In the measurement operation, the distance to an object and/or the velocity of the object are measured from the detection signal corrected based on the correction table generated by the calibration. The operation of the measurement process is summarized as follows:

The light source 110 emits laser light toward the object. The laser light is controlled by the control voltage having a triangular waveform as illustrated in FIG. 4, for example.

The photodetector 130 detects the interfering light between the reflected light from the object and the reference light and outputs a detection signal.

For at least one of the up-chirp duration and down-chirp duration, the processing circuit 140 corrects the detection signal in accordance with the control voltage based on the correction table and determines the distance from the measurement apparatus 100 to the object based on spectral peaks of the corrected detection signal. Furthermore, the processing circuit 140 determines the relative velocity of the object to the measurement apparatus 100 from the difference between the spectral peaks in the up-chirp and down-chirp durations.

Hereinafter, the calibration and measurement operations are described in more detail.

Calibration Operation

Figure 8:
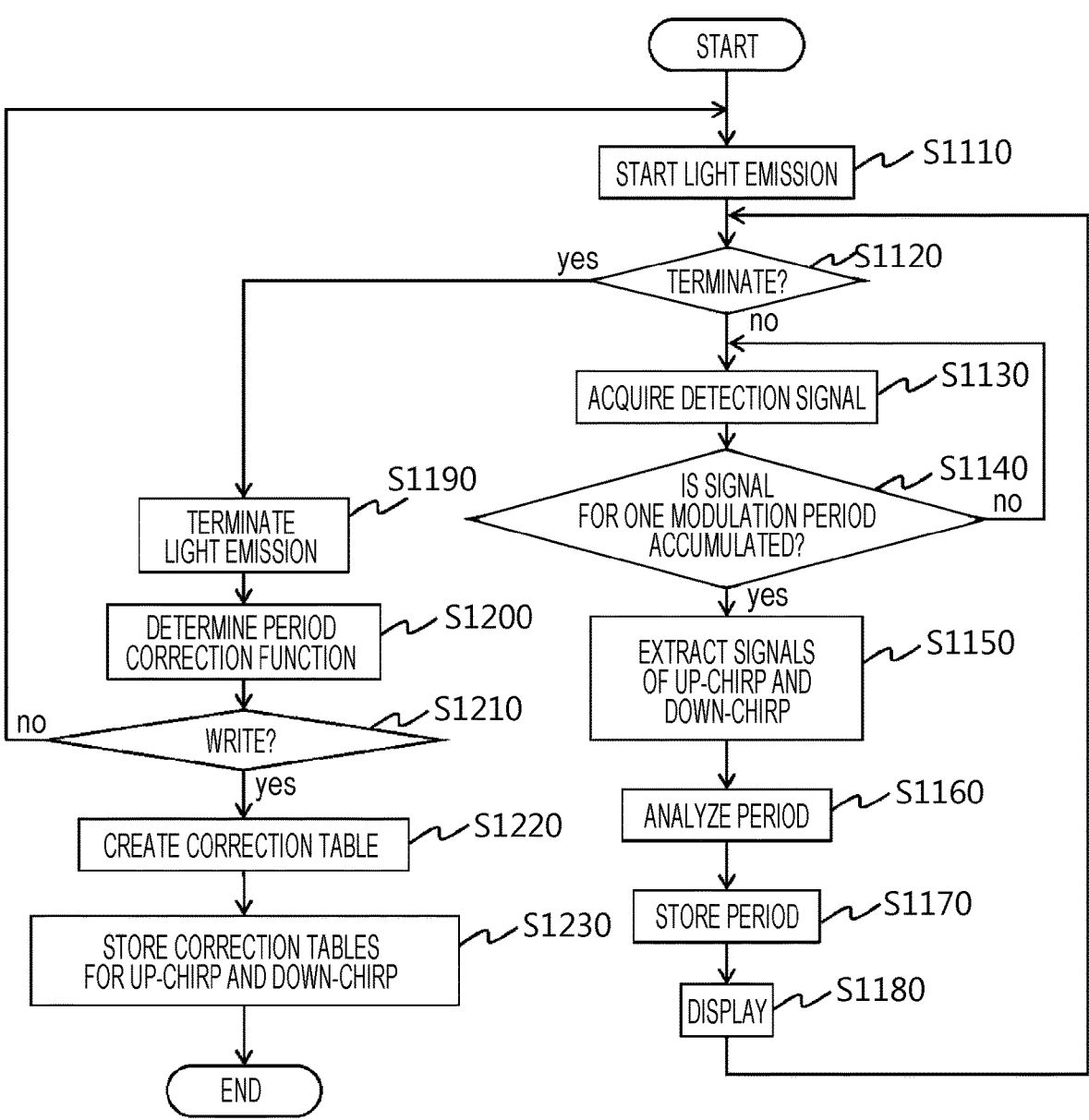
FIG. 8 is a flowchart illustrating a calibration operation by the measurement apparatus.

FIG. 8 is a flowchart illustrating the calibration operation of the measurement apparatus 100. In the calibration, the measurement apparatus 100 executes operations from step S1110 to S1230 illustrated in FIG. 8. Hereinafter, the operation of each step is described.

The measurement apparatus 100 starts the calibration operation in response to an input of an instruction to start the calibration operation by a not-illustrated input device.

<Step S1110> The processing circuit 140 causes the light source 110 to start emitting laser light. The processing circuit 140 applies the control voltage that periodically changes with a predetermined amplitude and thereby causes the light source 110 to emit laser light whose frequency periodically changes within a certain range. The laser light is split by the interference optical system 120 into the output light and the reference light. A stationary object (a reflector, etc., for example) is irradiated with the output light. The interference optical system 120 causes the interfering light between the reflected light from the object and the reference light to enter the photodetector 130. The photodetector 130 receives the interfering light and outputs the detection signal corresponding to the strength of the interfering light.

<Step S1120> The processing circuit 140 determines whether an instruction to terminate data processing was inputted. The processing circuit 140 determines whether the instruction to terminate data processing was inputted by the user, for example. The instruction to terminate data processing can be inputted by the user pressing a particular button on a screen displayed on the display apparatus 210, for example. The detail of the screen displayed on the display apparatus 210 is described later. When the instruction to terminate data processing was not inputted, the processing circuit 140 goes to step S1130. When the instruction to terminate data processing was inputted, the processing circuit 140 goes to step S1190.

<Step S1130> The processing circuit 140 acquires the detection signal outputted from the photodetector 130. The processing circuit 140 accumulates the detection signal in a primary storage apparatus, such as a memory, within the processing circuit 140.

<Step S1140> The processing circuit 140 determines whether the data length of the accumulated detection signal is longer than or equal to the data length for one period of the frequency modulation of the laser light outputted from the light source 110, that is, one period in which the control voltage increases and then decreases. When the data length of the accumulated detection signal is longer than or equal to that for one period of the frequency modulation, the processing circuit 140 goes to step S1150. When the data length of the accumulated detection signal is shorter than that for one period of the frequency modulation, the processing circuit 140 returns to step S1130.

<Step S1150> The processing circuit 140 extracts from the detection signal accumulated in the primary storage apparatus, a signal for the up-chirp duration and a signal for the down-chirp duration. The processing circuit 140 performs processing in steps S1160 and S1170 separately for the signals for the up-chirp duration and the down-chirp duration.

<Step S1160> The processing circuit 140 analyzes the period of the extracted detection signal. The method of analyzing the period includes the following method, for example. The processing circuit 140 specifies a point with the maximum value in each convex-upward part of the waveform of the detection signal or a point with the minimum value in each convex-downward part and determines one period as the period of time from a certain point with the maximum value to the next point with the maximum value, or the period of time from a certain point with the minimum value to the next point with the minimum value. Alternatively, when values of the detection signal are distributed evenly between the positive and negative sides, the period may be determined based on zero-cross points. The zero-cross points are points at which the detection signal changes from a positive to a negative value or changes from a negative to a positive value. The processing circuit 140 may extract zero-cross points from the detection signal and determine one period as the period of time from a certain zero-cross point at which the detection signal changes from a positive to a negative value to the next zero-cross point from a positive to a negative value or the period of time from a certain zero-cross point from a negative to a positive value to the next zero-cross point from a negative to a positive value.

Figure 9:
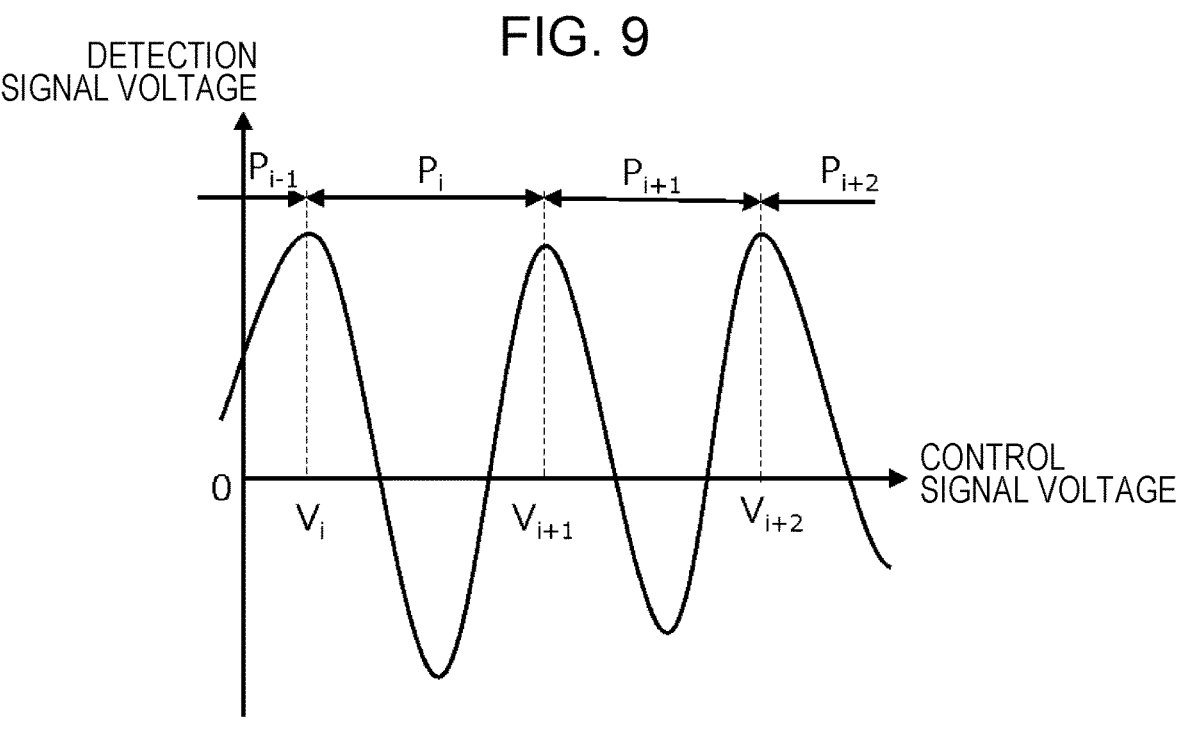
FIG. 9 is a graph illustrating a result example of a period analysis of a detection signal.

FIG. 9 is a graph illustrating a result example of a period analysis of the detection signal. This example plots the waveform representing the relationship between the voltage of the control signal and the voltage of the detection signal. The period when the control signal voltage is Vi, Vi+1, Vi+2, . . . , at which the voltage of the detection signal reaches the peak, that is, the maximum value, in each convex-upward part, is defined as Pi, Pi+1, Pi+2, . . . , respectively. In this example, the time length from the time at which the control signal voltage is Vi to the time at which the control voltage is Vi+1 is defined as a period Pi.

<Step S1170> The processing circuit 140 stores the determined period in the primary storage apparatus within the processing circuit 140. For example, the processing circuit 140 stores the determined period in the primary storage apparatus in association with the corresponding control voltage or the time elapsed from a reference point of time in one period.

Figure 10:
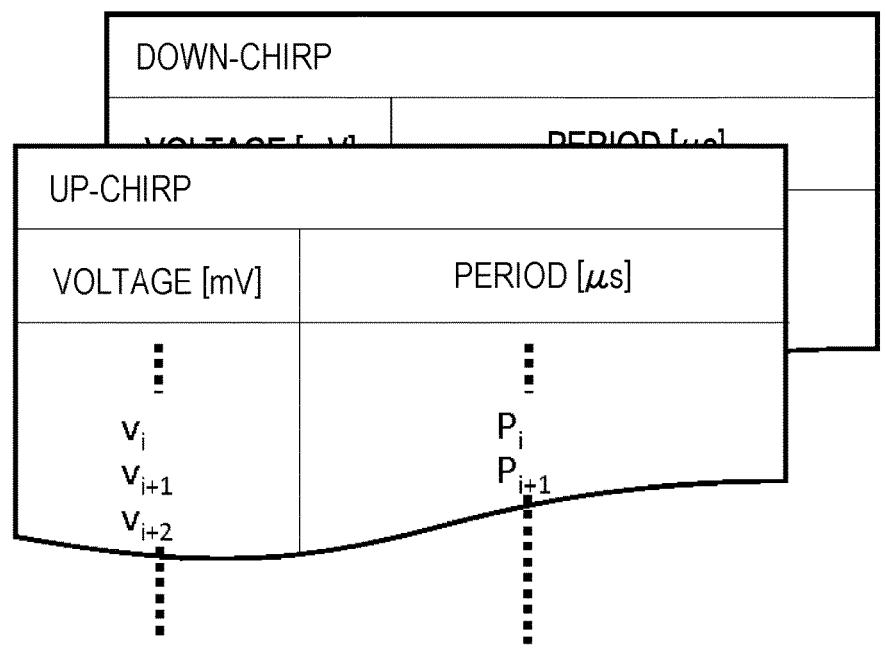
FIG. 10 is a diagram illustrating an example of period data stored in a primary storage apparatus.

FIG. 10 is a diagram illustrating an example of period data stored in the primary storage apparatus. In this example, the control voltage and the period are recorded in association with each other individually for the up-chirp and the down-chirp. The period may be recorded in association with time from the reference point of time instead of the control voltage.

<Step S1180> The processing circuit 140 causes the display apparatus 210 to display the result of the period analysis. For example, the processing circuit 140 causes the display apparatus 210 to display graphs indicating the control voltage-period relationship that is generated for each of the up-chirp and down-chirp. After step S1180, the processing circuit 140 returns to step S1120 and repeats the above-described operation.

Figure 11A:
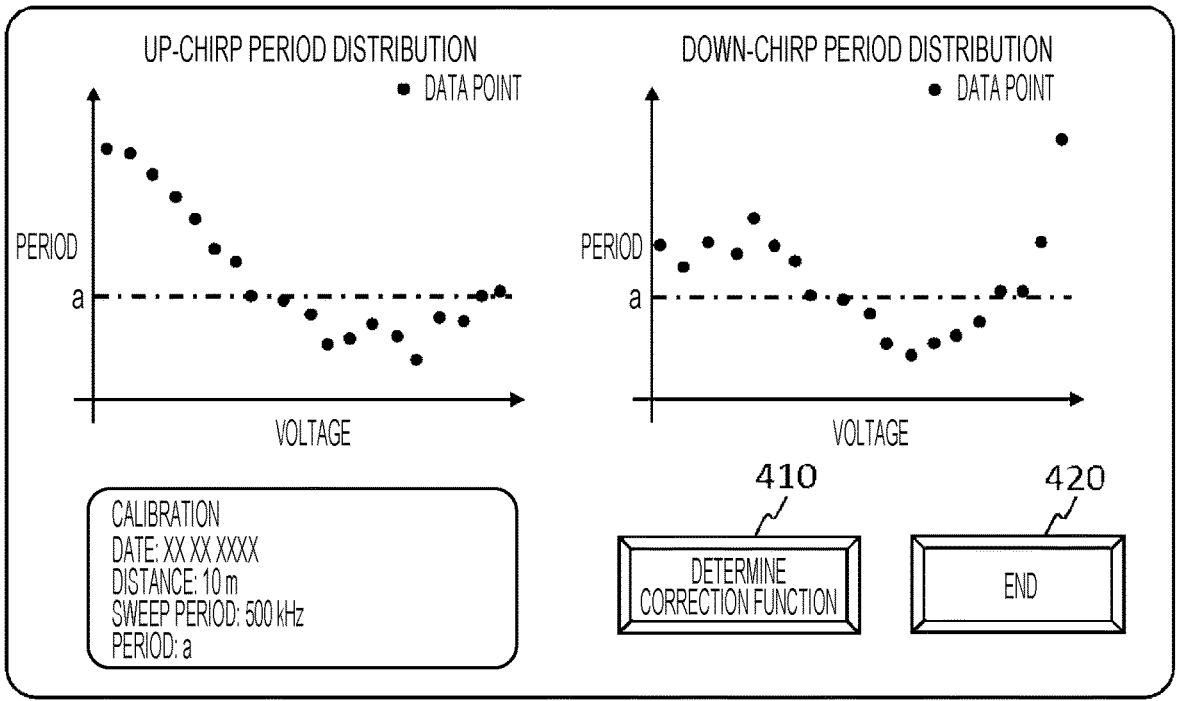
FIG. 11A is a diagram illustrating a display screen example.

FIG. 11A is a diagram illustrating a display screen example displayed by the display apparatus 210. In this example, the period of the interference wave in the up-chirp and the period of the interference wave in the down-chirp are plotted in association with the control voltage. In addition, the display screen can display information including the date, the distance to an object as a target of calibration, and the period or frequency of frequency sweep. On the display screen illustrated in FIG. 11A, a button 410 to determine a correction function and a button 420 to force quit calibration are also displayed. The button 410 to determine a correction function is a button to issue an instruction to terminate the operation from step S1130 to step S1170 and move forward the operation to step S1190 and the following steps. The force quit button 420 is a button to issue an instruction to instantaneously terminate the operation. When the force quit button 420 is pressed, the operation is instantaneously terminated at any point of time in the flowchart of FIG. 8. The flowchart of FIG. 8 does not include the force quit operation when the button 420 for instantaneous termination, which is illustrated in FIG. 11A, is pressed.

<Step S1190> When the button 410 to determine a correction function in the display screen is pressed, the processing circuit 140 determines that an instruction to terminate data processing is issued in step S1120 and causes the light source 110 to stop emitting the laser light.

<Step S1200> The processing circuit 140 approximates the graph of the period of the interfering wave against the control voltage by a function model. The function model is a polynomial of two or more degrees, for example and can be determined using least-squares, for example. The processing circuit 140 causes the display apparatus 210 to display the determined function model as the correction function.

Figure 11B:
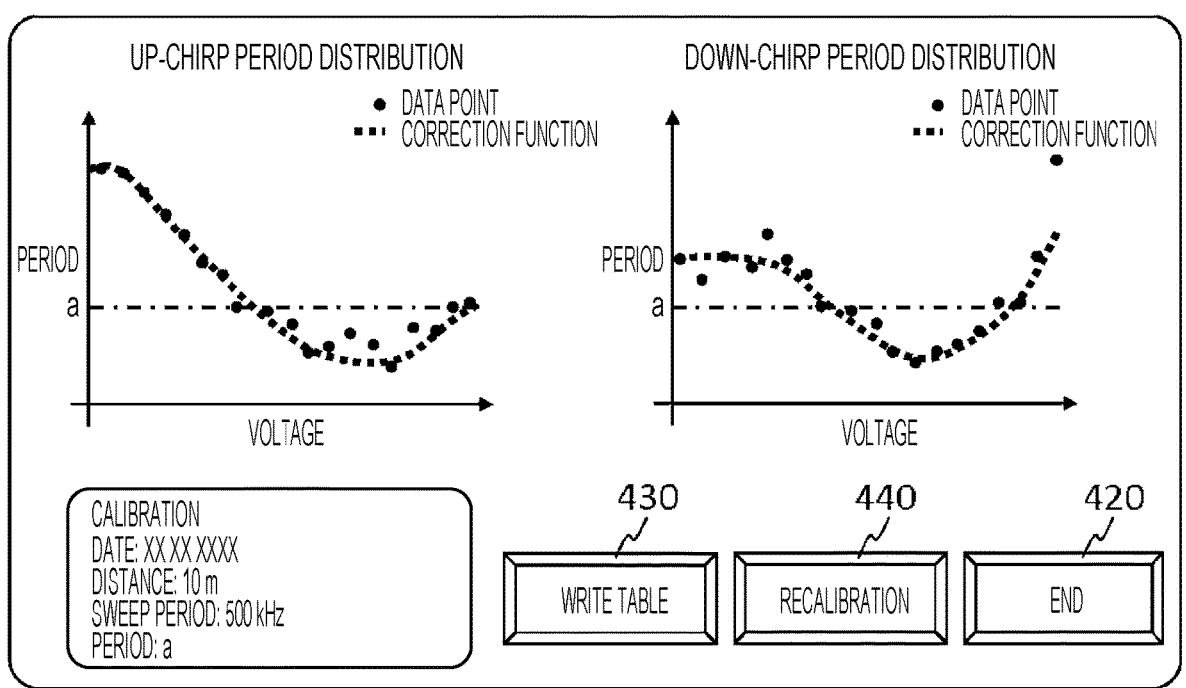
FIG. 11B is a diagram illustrating another display screen example.

FIG. 11B is a diagram illustrating a screen example displayed in step S1200. In this example, graphs of approximation functions indicated by dotted lines are superimposed on the graphs of the up-chirp and down-chirp. This screen example also includes a button 430 to issue an instruction to write a table, a button 440 to issue an instruction to execute recalibration, and the button 420 to issue an instruction to force quit calibration.

<Step S1210> In step S1210, the processing circuit 140 determines whether an instruction to create a correction table using the correction function determined in step S1200 and write the generated correction table in the storage apparatus 150 was issued. The write instruction is issued when the button 430, "WRITE TABLE", illustrated in FIG. 11B is pressed. When the button 430 was pressed, the processing circuit 140 goes to step S1220. When the button 430 was not pressed for a predetermined period of time or when the button 440, "RECALIBRATION", was pressed, the processing circuit 140 returns to step S1110, and the calibration restarts.

<Step S1220> The processing circuit 140 creates a correction table based on values of the function created in step S1200. Specifically, for values of the control voltage, the processing circuit 140 calculates correction values by dividing a value a corresponding to the distance to the calibration target by values of the correction function. The correction value corresponding to a control voltage V is a/f(V) where V is the control voltage and f(V) is the correction function. The processing circuit 140 creates a correction table that defines the correspondence relationship between the control voltage and correction values for each of the up-chirp and down-chirp. The correction tables are used to correct the period or frequency of the detection signal in distance or velocity measurement.

<Step S1230> The processing circuit 140 outputs to the storage apparatus 150, the correction table for the up-chirp and the correction table for the down-chirp which are created in step S1220. The storage apparatus 150 stores those correction tables.

Figure 12:
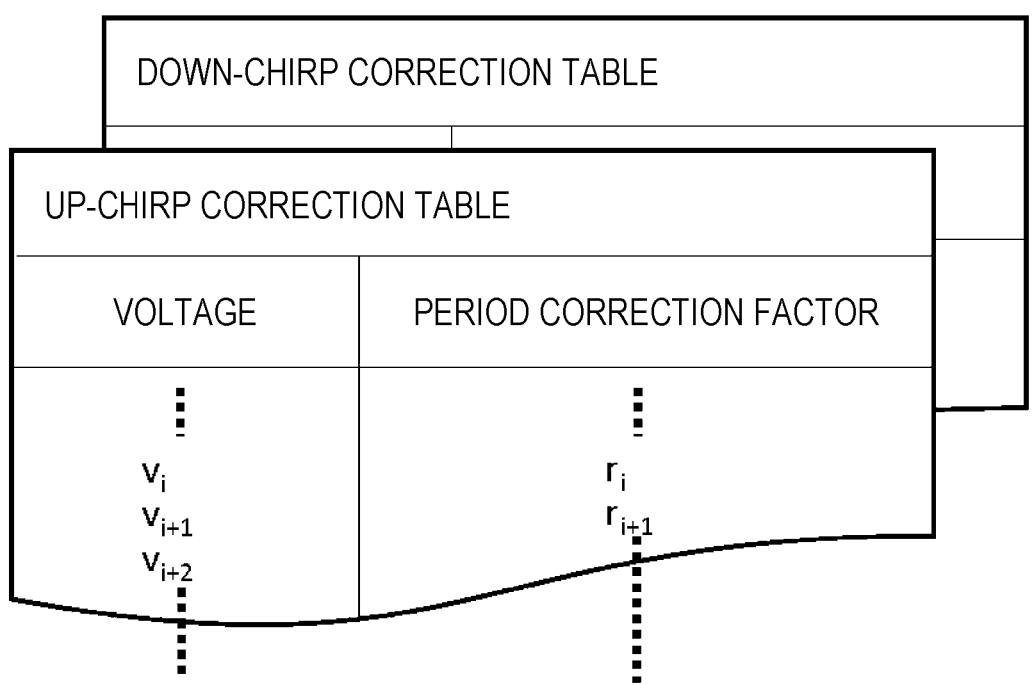
FIG. 12 is a diagram illustrating a correction table example.

FIG. 12 is a diagram illustrating correction table examples stored in the storage apparatus 150. In this example, the correction tables for the up-chirp and down-chirp have the same data form. Each correction table holds information on values of the control voltage applied to the light source 110 and period correction factors that are numerical values for correcting periods of the detection signal. The form of the correction tables is not limited to the example illustrated in FIG. 12. Regardless of the form, each correction table can include information on correction values for adjusting periods of the detection signal that are longer or shorter than they are supposed to be.

The period correction factors can be values obtained by normalizing the periods with a predetermined constant so that the beat frequency of the corrected waveform of the detection signal be a value theoretically derived from the distance of the reference object, the modulation period, the modulation frequency range, and the light speed, for example. The constant can be set to such a value that the beat frequency of the corrected waveform of the detection signal can correspond to a theoretical value.

The measurement apparatus 100 according to the embodiment is able to accumulate sufficient data to determine the correction function by repeating the operation from step S1120 to step S1180. When the data is unstable, the measurement apparatus 100 is able to conduct the calibration operation again to create a preferable correction table by repeating step S1110 to step S1210.

In step S1160, each period can be determined to be the period of time from the maximum point in a certain convex-upward part to the maximum point in the next convex-upward part, the period of time from the minimum point in a certain convex-downward part to the minimum point in the next convex-downward part, or the like, for example. The method of determining periods is not limited to the aforementioned methods. When the number of sampling points in digitized data is insufficient for each period, the maximum point in any convex-upward part of the data points or the minimum point in any convex-downward part sometimes does not correspond to the peak point or the like of the actual signal. In such a case, the peak point of the signal may be estimated by fitting of a waveform model.

Figure 13:
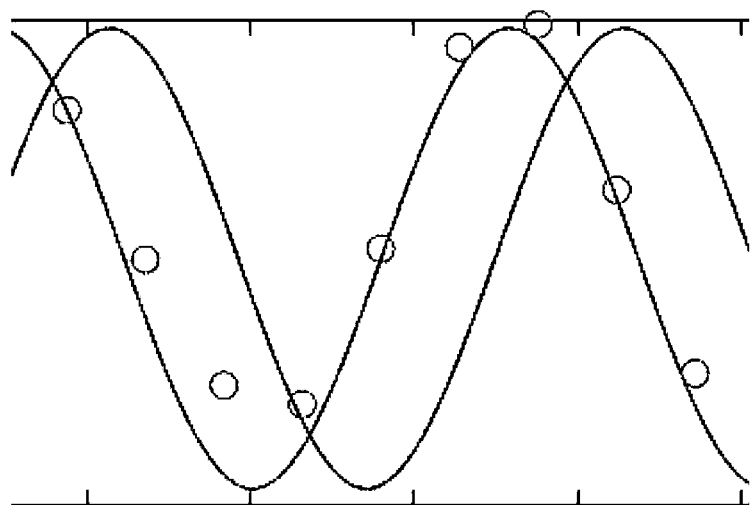
FIG. 13 is a diagram for explaining an example of a process to estimate peak points.

FIG. 13 is a diagram for explaining an example of the process to estimate peak points. In the example of FIG. 13, the processing circuit 140 includes an analog-digital (A/D) converter and a primary storage apparatus, such as a memory. The processing circuit 140 digitizes the waveform of the detection signal with the A/D converter and stores the resultant data in the primary storage apparatus. In FIG. 13, plural digitized data points are circled. The horizontal axis in the drawing represents time. The processing circuit 140 employs a sine wave as a wave model and determines the wave model so as to minimize the distance between the sine wave and the data points. FIG. 13 illustrates a sine wave with the smallest distance to the data points and a sine wave with a greater distance to the data points. The processing circuit 140 may determine periods of the detection signal based on the peak points (that is, the maximum points), minimum points, or zero-cross points of the determined wave model. Since the period and the frequency have a reciprocal relationship, determining the period is equivalent to determining the frequency.

In the flowchart illustrated in FIG. 8, the user determines in step S1120 whether to terminate the data accumulation. However, the processing circuit 140 may automatically determine to terminate the data accumulation. For example, the processing circuit 140 may automatically terminate the data accumulation when a predetermined number of data is accumulated, when fluctuation of the variance of the accumulated data lowers below a predetermined value, or based on any other criteria. When the determination in step S1120 is made automatically, the display operation in step S1180 may be omitted.

Figure 14:
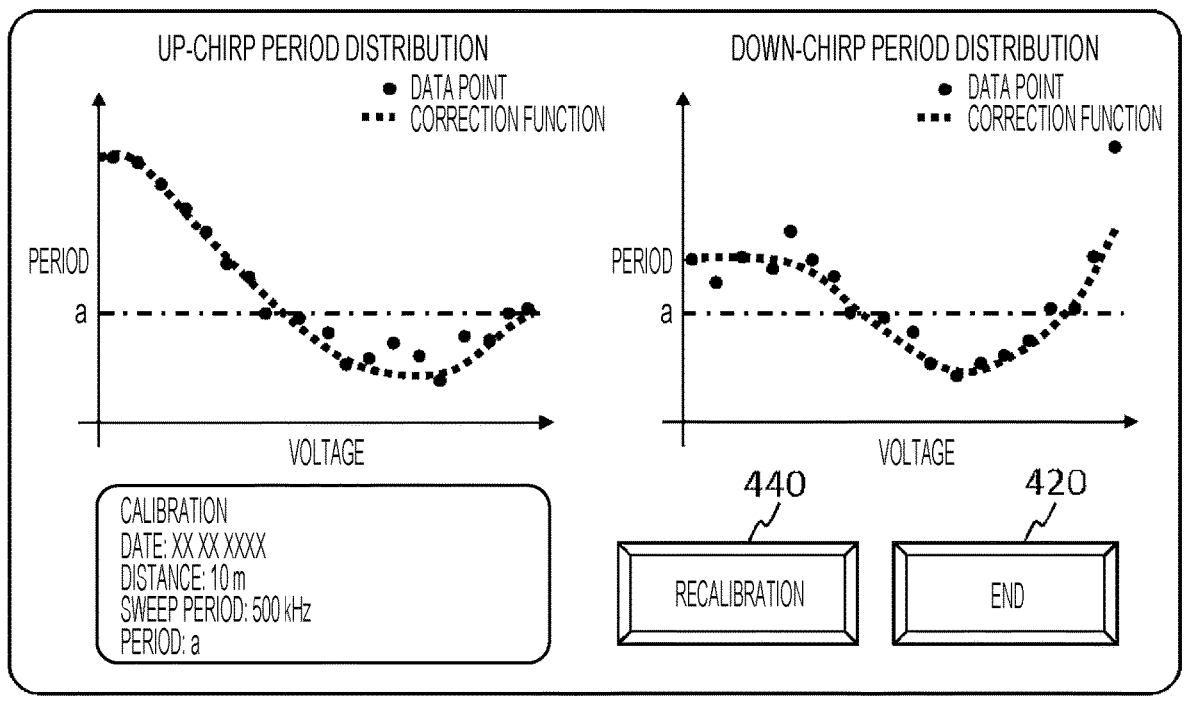
FIG. 14 is a still another display screen example.

When the termination determination in step S1120 is configured to be made automatically, the display apparatus 210 may display a user interface that allows the user to issue an instruction to alter the determination that was automatically made. FIG. 14 is a diagram illustrating an example of such a user interface. In this example, data and correction functions of the up-chirp and down-chirp are sequentially displayed on the display screen, and the button 440 to issue an instruction to execute recalibration is also displayed. The user monitors correction functions displayed on the display screen and presses the recalibration button 440 when determining that the correction functions should be recreated, that the amount of data is too small to determine the correction functions, or that the data are improper. In response to this, the processing circuit 140 repeats the operation from step S1120 to step S1180. This can accumulate more data to create the correction functions. It is therefore possible to set accurate correction functions even when there is a problem, such as noise contamination in the data for some reason.

In the flowchart of FIG. 8, the correction table for the up-chirp and the correction table for the down-chirp are created in parallel, and the steps concerning creation of the correction tables for the up-chirp and down-chirp are carried out in the same manner. However, the steps concerning creation of the correction tables for the up-chirp and down-chirp may be carried out in different timings. That is, the determination to terminate the data accumulation in step S1120 may be separately performed for the up-chirp and down-chirp. Furthermore, the determination in step S1210 whether to write correction values of the period may be separately performed for the up-chirp and down-chirp.

Figure 15:
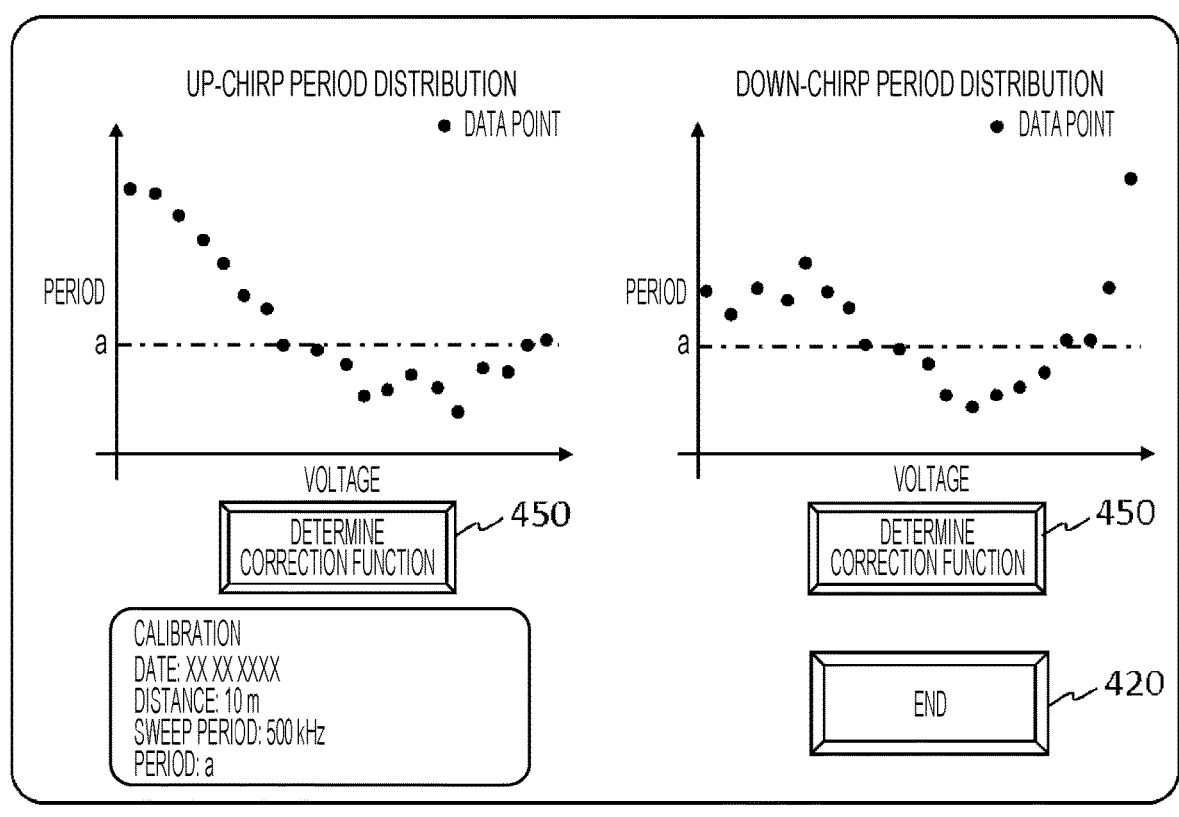
FIG. 15 is a still another display screen example.

FIG. 15 is a diagram illustrating a user interface example that allows the user to separately perform determination for the up-chirp and the down-chirp whether to write correction values. In this example, a correction function determination button 450 is prepared for each of the graphs of the up-chirp and down-chirp. The user is able to press only the button 450 that is provided for any one of the up-chirp and down-chirp for which the data is determined to be already accumulated enough to determine the correction function. When one of the buttons 450 is pressed, the processing circuit 140 stops the data accumulation corresponding to the pressed button 450 and proceeds to determination of the correction function. For the other one of the up-chirp and down-chirp, whose button 450 is not pressed, the processing circuit 140 further repeats the operation of data accumulation. When the user determines to terminate the data accumulation for the up-chirp and down-chirp and presses both the correction function determination buttons 450, the processing circuit 140 causes the light source 110 to stop emitting the laser light.

As for the determination to terminate the data accumulation in step S1120, the processing circuit 140 may automatically determine to terminate the data accumulation based on the number of accumulated data, a statistic criterion, or the like. In this case, the criterion for the up-chirp and the criterion for the down-chirp may be configured to be individually set.

Distance and Velocity Measurement Operation

Next, an operation example of distance and velocity measurement by the measurement apparatus 100 is described.

Figure 16:
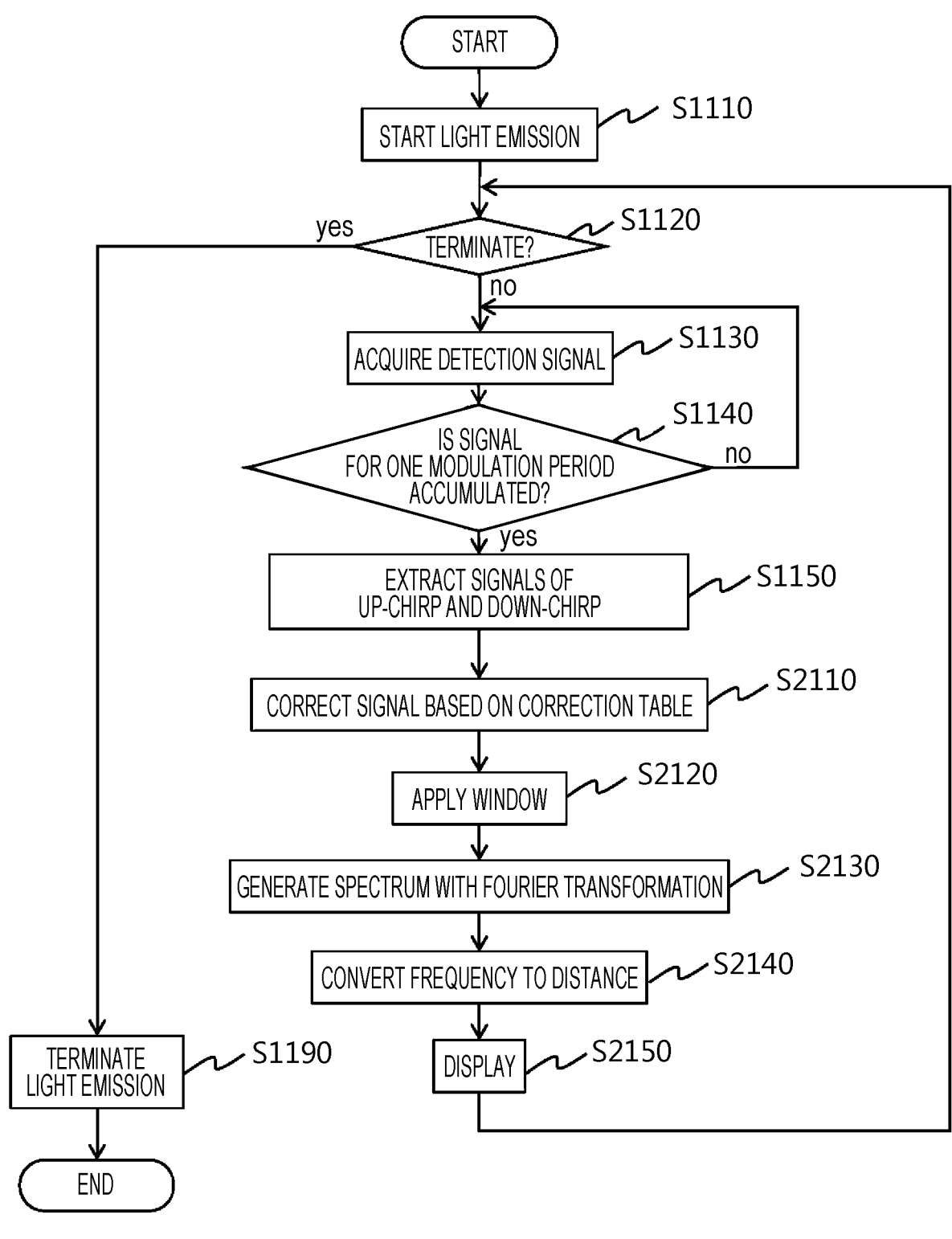
FIG. 16 is a flowchart illustrating an operation example of distance and velocity measurement by the measurement apparatus.

FIG. 16 is a flowchart illustrating an operation example of distance and velocity measurement by the measurement apparatus 100. At distance and velocity measurement, the measurement apparatus 100 executes the operation from step S1110 to step S2150 illustrated in FIG. 16. The operation from step S1110 to S1150 and in step S1190 are the same as the operation in the corresponding steps illustrated in FIG. 8. Hereinafter, the operation of each step is described.

The measurement apparatus 100 starts the measurement operation in response to an input of an instruction to start the measurement operation through a not-illustrated input device.

<Step S1110> The processing circuit 140 causes the light source 110 to start emitting laser light. The processing circuit 140 applies the control voltage periodically changing with a predetermined amplitude to the light source 110, causing the light source 110 to emit laser light whose frequency periodically changes within a certain range. The laser light is split into the output light and the reference light by the interference optical system 120. The object 300 is irradiated with the output light. The interference optical system 120 causes the interfering light between the reflected light from the object 300 and the reference light to enter the photodetector 130. The photodetector 130 receives the interfering light and outputs the detection signal corresponding to the strength of the interfering light.

<Step S1120> The processing circuit 140 determines whether an instruction to terminate measurement was inputted. The processing circuit 140 determines whether the instruction to terminate measurement was inputted by the user, for example. The instruction to terminate measurement can be inputted by the user pressing a particular button in a screen displayed on the display apparatus 210, for example.

FIG. 17 is a diagram illustrating a screen example displayed by the display apparatus 210 during measurement. This screen includes an end button 520 to issue the instruction to terminate measurement. When the user presses the button 520, the instruction to terminate measurement is inputted. When the instruction to terminate measurement was not inputted, the processing circuit 140 goes to step S1130. When the instruction to terminate measurement was inputted, the processing circuit 140 goes to step S1190.

<Step S1130> The processing circuit 140 acquires the detection signal outputted from the photodetector 130. The processing circuit 140 accumulates the detection signal in the primary storage apparatus such as a memory within the processing circuit 140.

<Step S1140> The processing circuit 140 determines whether the data length of the accumulated detection signal is longer than or equal to the data length for one period of the frequency modulation of the laser light outputted from the light source 110. When the data length of the accumulated detection signal is longer than or equal to that for one period of the frequency modulation, the processing circuit 140 goes to step S1150. When the data length of the accumulated detection signal is shorter than that for one period of the frequency modulation, the processing circuit 140 returns to step S1130.

<Step S1150> The processing circuit 140 extracts from the detection signal accumulated in the primary storage apparatus, a signal for the up-chirp duration and a signal for the down-chirp duration.

<Step S2110> The processing circuit 140 corrects the signals for the up- and down-chirp durations extracted in step S1150 with reference to the correction tables stored in the storage apparatus 150.

FIG. 18 is a diagram illustrating waveform examples of the detection signal before and after correction. The solid line indicates the detection signal before correction, and the dashed line indicates the detection signal after correction. The horizontal axis represents time corresponding to the detection signal before correction. The processing circuit 140 divides the detection signal into a signal for the up-chirp duration and a signal for the down-chirp duration and corrects these signals using information on correction values described in the correction tables. For example, the processing circuit 140 multiplies instantaneous period values of the signal of each chirp by the corresponding correction values indicated in the correction table, thus shortening the period of a portion of the signal that is longer than expected and elongating the period of a portion of the signal that is shorter than expected. The signal of each chirp can be thereby corrected so as to keep the period substantially constant.

To be more specific, the processing circuit 140 first extracts one period from the signal of each chirp extracted in step S1150. In a similar manner to the calibration operation, signal extraction of one period can be performed by a method of extracting a signal portion between two peak points or two zero-cross points (points at which the signal changes from negative to positive, for example) that are adjacent on the time axis, for example. Next, the processing circuit 140 sets the reference point to the start of the extracted portion of one period and determines the driving voltage corresponding thereto. The processing circuit 140 then refers to the correction tables (see FIG. 12) stored in the storage apparatus 150 and acquires the correction value (that is, the period correction factor) corresponding to the determined driving voltage. The processing circuit 140 multiplies the period of the detection signal by the acquired period correction factor to correct the period and modify the waveform of the detection signal. The processing circuit 140 executes the aforementioned operation for each period of the detection signal to produce the waveform of the detection signal after correction. This process is independently performed for the signal for the up-chirp duration and the signal for the down-chirp duration that are extracted in step S1150. The processing from step S2110 to step S2130 is separately performed for the signal for the up-chirp duration and the signal for the down-chirp duration.

<Step S2120> The processing circuit 140 multiplies the detection signals of the up-chirp and down-chirp that are corrected in step S2110, by a window function, Hanning window, for example, to modify the waveform of each signal to a waveform appropriate for the frequency analysis.

<Step S2130> The processing circuit 140 applies Fourier transformation to the detection signals for the up-chirp duration and the down-chirp duration to generate frequency spectra.

<Step S2140> The processing circuit 140 extracts the maximum spectral peak from each of the frequency spectra of the up- and the down-chirp durations generated in S2130 to determine the frequency (that is, beat frequency) of each chirp. Next, the processing circuit 140 calculates the value of the distance based on the determined frequency of each chirp duration with reference to a conversion table stored in the storage apparatus 150.

FIG. 19 is a diagram illustrating a conversion table example that defines the relationship between the beat frequency and distance. Such a conversion table can be previously stored in the storage apparatus 150. As illustrated in FIGS. 20A and 20B, the storage apparatus 150 may store a conversion table corresponding to the up-chirp and a conversion table corresponding to the down-chirp. Instead of the conversion tables, the relationship between the beat frequency and the distance may be recorded in another data form, such as a function.

In the case of using the conversion tables illustrated in FIGS. 20A and 20B, the processing circuit 140 acquires the distance based on the beat frequency of the up-chirp duration with reference to the conversion table for the up-chirp. The processing circuit 140 also acquires the distance based on the beat frequency of the down-chirp duration with reference to the conversion table for the down-chirp.

The processing circuit 140 determines the distance to be finally outputted by taking the average between the distance acquired from the beat frequency of the up-chirp duration and the distance acquired from the beat frequency of the down-chirp duration, for example. The processing circuit 140 may determine the distance to be finally outputted by selecting one of the distance acquired from the beat frequency of the up-chirp duration and the distance acquired from the beat frequency of the down-chirp duration.

On the other hand, the processing circuit 140 calculates the velocity of the object 300 based on the difference (hereinafter, also referred to as a "frequency difference") between the beat frequency of the up-chirp duration and the beat frequency of the down-chirp duration. The beat frequency of the up-chirp duration being higher than the beat frequency of the down-chirp duration indicates that the object 300 is moving away from the measurement apparatus 100. The beat frequency of the up-chirp duration being lower than the beat frequency of the down-chirp duration indicates that the object 300 is moving toward the measurement apparatus 100.

FIG. 21 is a diagram illustrating a conversion table example that defines the relationship between the frequency difference and velocity. Such a conversion table can be previously created and recorded in the storage apparatus 150. The processing circuit 140 can calculate the velocity from the frequency difference with reference to such a conversion table. The processing circuit 140 can use, not limited to the conversion tables, data in another form, such as a function that defines the relationship between the frequency difference and velocity.

<Step S2150> The processing circuit 140 causes the display apparatus 210 to display the distance and velocity calculated in step S2140. As illustrated in FIG. 17, for example, the measurement values of the distance and velocity can be displayed as indicators and/or numerical values. After step S2150, the processing circuit 140 returns to step S1120.

<Step S1190> When the termination instruction is detected in step S1120, the processing circuit 140 goes to step S1190 and terminates emission of the laser light by the light source 110, thus terminating the operation of the measurement apparatus 100.

When the object 300 is moving, there is a difference between the beat frequency of the up-chirp duration and the beat frequency of the down-chirp duration. The processing circuit 140 may cause the display apparatus 210 to display the beat frequency of the up-chirp duration and the beat frequency of the down-chirp duration. When the velocity of the object 300 is not being measured, such a display enables the user to know that the object 300 is moving.

Figure 22A:
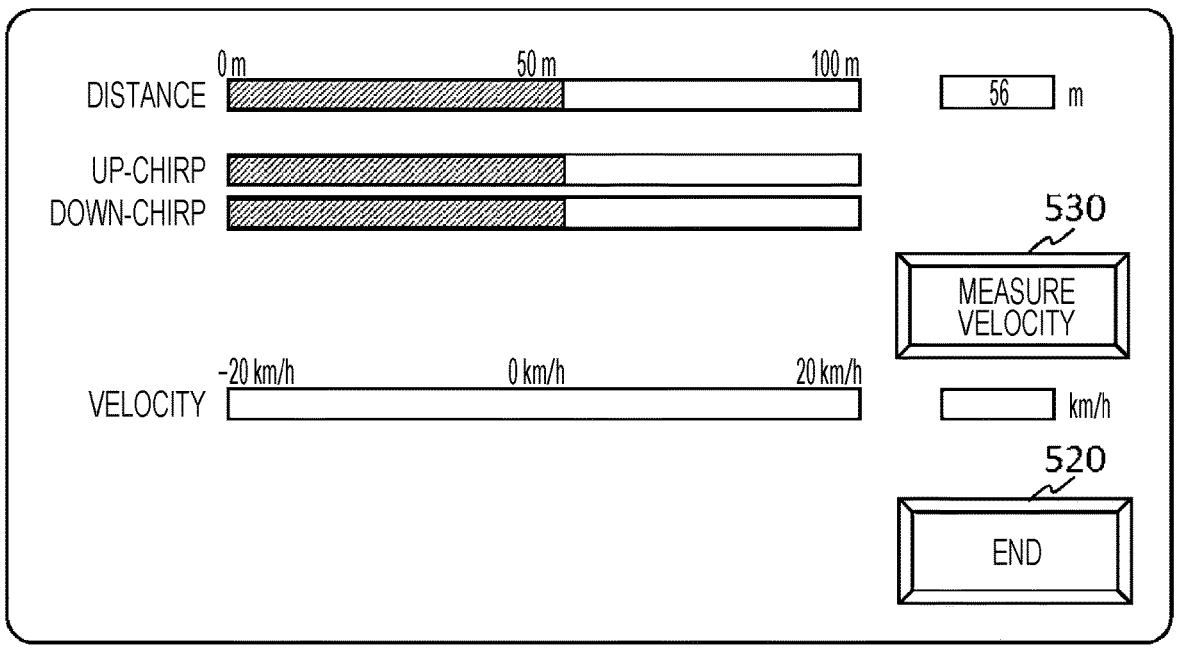
FIG. 22A illustrates a screen example of ranging results when the object is at rest.
Figure 22B:
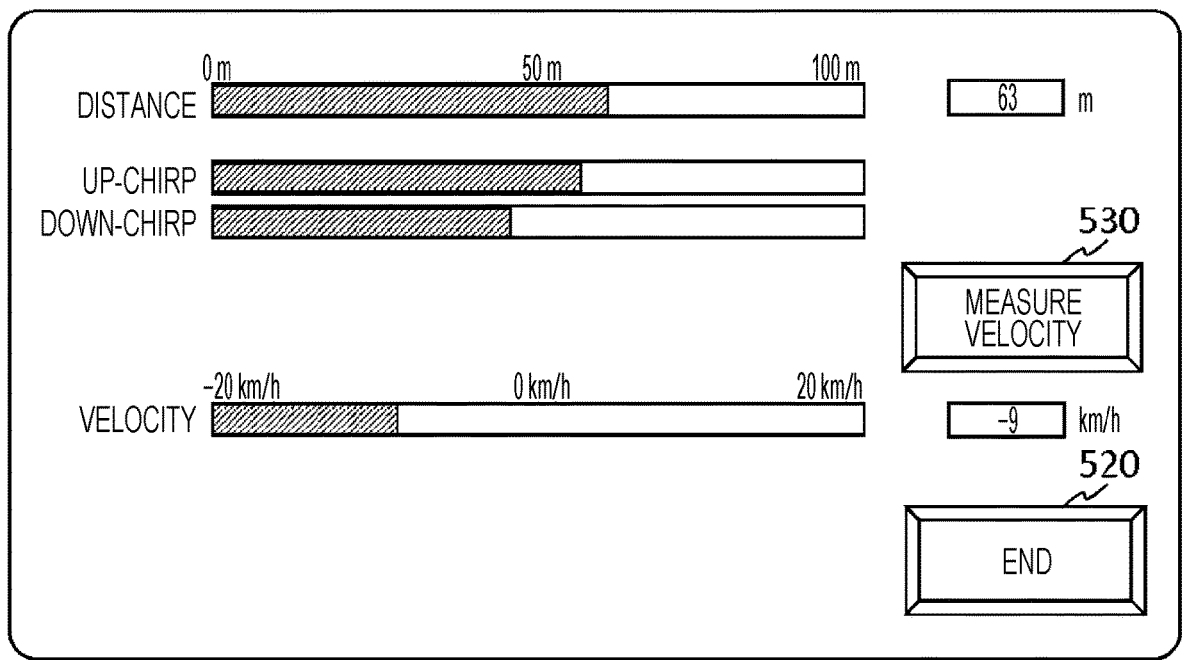
FIG. 22B illustrates a screen example of ranging and velocity measurement results when the object is moving.

FIGS. 22A and 22B are diagrams illustrating screen examples that display the beat frequencies of the respective chirp durations. FIG. 22A illustrates a screen example of ranging results when the object 300 is at rest. FIG. 22B illustrates a screen example of ranging and velocity measurement results when the object 300 is moving. In this example, in addition to the display indicating the results of distance and velocity measurement, the display apparatus 210 displays indicators indicating magnitudes of the beat frequencies of the up- and the down-chirp durations and a velocity measurement button 530. The processing circuit 140 normally measures only the distance and does not measure the velocity. When the velocity measurement button 530 is pressed by the user, the processing circuit 140 measures the velocity in addition to the distance and causes the display apparatus 210 to display the measurement results. The user is therefore able to use the indicators to check the difference between the beat frequencies of the up-chirp duration and the down-chirp duration that are displayed on the screen. When there is no difference in beat frequency between the up- and down-chirp durations like the example in FIG. 22A, it means that the object 300 is at rest. When there is a difference in beat frequency between the upand down-chirp durations like the example in FIG. 22B, it means that the object 300 is moving. When the user presses the velocity measurement button 530 in such a case, the processing circuit 140 measures the velocity, and the result of measurement is displayed. In the display example of FIG. 22B, the user is able to see that the object 300 is moving at 9 km/h in the direction away from the measurement apparatus 100. In such a display, the user is able to know whether the object 300 is moving or at rest by looking at the indication of the distance and the beat frequencies of the up- and down-chirp durations and perform measurement suitable for the object 300.

In the embodiment, as the correction data, the correction table or correction function that defines the correspondence relationship between the control voltage and correction values of the period is created for each of the up-chirp and the down-chirp and is stored in the storage apparatus 150. The correction data are not limited to the above data and may be data such as a table or a function that defines the driving current of the laser light source and correction values of the period, for example. When the frequency of the laser light is modulated periodically, the correction data may be data such as a table or a function that defines phases in the modulation period and correction values of the period.

The processing circuit 140 in the embodiment corrects the detection signal by correcting based on the correction data, the period of the detection signal non-linearly changing with time. Instead of such a method, the same effect can be implemented by changing the timing of sampling of the detection signal, for example. To be specific, the detection signal may be corrected by properly changing the timing of digitization in which sampling is supposed to be performed at regular time intervals, in accordance with the control voltage, driving current, or phase.

FIG. 23A is a diagram illustrating a correction table example including information on correction values to change the timing of sampling of the detection signal. In this example, each of the correction tables of the up-chirp and down-chirp includes information on sampling intervals corresponding to values of the driving voltage. The processing circuit 140 may correct the detection signal by referring to such a table and correcting the sampling intervals that are supposed to be regular intervals.

FIG. 23B is a diagram illustrating another correction table example. The correction table in this example includes information on phases in the period of the frequency modulation of the laser light and period correction factors corresponding to the respective phases. FMCW LiDARs repeat the frequency modulation of the laser light to continually execute ranging and velocity measurement. When the period of frequency modulation is consistent and the same control signal is repeated, the same effect as described above can be provided using a correction table that defines phases in the sweep period and period correction factors as illustrated in FIG. 23B. Alternatively, as illustrated in FIG. 23C, the processing circuit 140 can use a correction table that defines phases in the sweep period and sampling intervals. The processing circuit 140 can provide the same effect as described above by correcting the timing of sampling of the detection signal with reference to such a table. In the examples of FIGS. 23B and 23C, each table includes correction data for the up-chirp duration (that is, the duration corresponding to phases from 0 to π) and correction data for the down-chirp duration (that is, the duration corresponding to phases from π to 2π). Instead of such a table, the correction data for the up-chirp and the correction data for the down-chirp may be separately recorded.

Effect

According to the embodiment, as described above, the processing circuit 140 corrects the detection signal of the interfering wave using correction data for the up-chirp duration and correction data for the down-chirp duration that are created by calibration in advance. The correction data for each chirp duration can include information on correction values for correcting the period of the detection signal or correction values for correcting the timing of sampling of the detection signal, for example. The correction values can be recorded in association with the control voltage for sweeping the frequency of the laser light emitted from the light source 110, values of the laser driving current, or phases in the period of the frequency modulation, for example. Based on such correction data, the processing circuit 140 temporally corrects the detection signal. The processing circuit 140 calculates the distance based on the frequencies of spectral peaks obtained by Fourier transformation for the corrected detection signal. In addition, the processing circuit 140 is able to determine the velocity of the object 300 based on the difference between the frequency of the spectral peak in the up-chirp and the frequency of the spectral peak in the down-chirp. In such a manner, the processing circuit 140 temporally corrects the detection signal for each of the up-chirp duration and the down-chirp duration before Fourier transformation. This can reduce distortion in the spectral pattern obtained by Fourier transformation of the detection signal for each chirp duration, thus improving the accuracy of distance data obtained in each chirp duration. The improvement in accuracy of distance data obtained in each chirp duration can enhance the measurement accuracy of the velocity obtained from the difference in frequency between the up- and the down-chirp durations.

Modification 1

Figure 24:
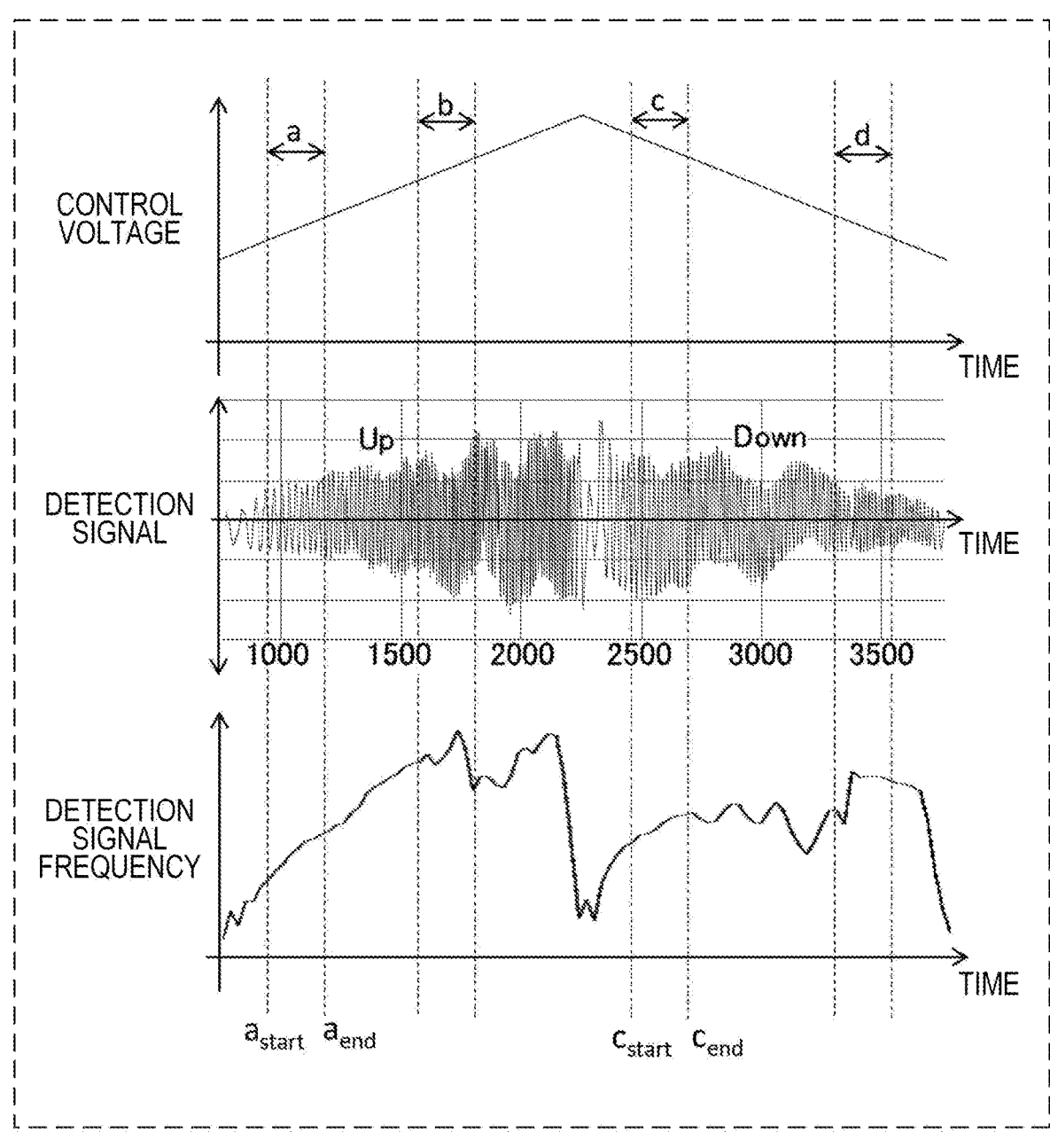
FIG. 24 is a diagram for explaining the operation of Modification 1 of Embodiment 1.

FIG. 24 is a diagram for explaining the operation of Modification 1 of Embodiment 1. In the FMCW system, the modulation period of the frequency is sometimes longer than the observation duration of the interfering waves, that is, the duration for which the detection signal is acquired. For example, the detection signal can be acquired in a period of time shorter than the modulation period, like a, b, c, and d sectioned with dashed lines illustrated in FIG. 24. Even in such a case, the aforementioned method of temporally correcting the detection signal before Fourier transformation is effective.

The table, illustrated in FIG. 12, for example, for recording of correction values, such as period correction factors, of the interfering wave signal corresponding to the voltage of the control signal can be created over one period of the control signal (that is, one period of the frequency modulation). In this case, correction processing similar to that of Embodiment 1 can be performed even when the time length of the detection signal acquired for distance and velocity measurement is shorter than the period of the frequency modulation, like the cases of a, b, c, or d in FIG. 24.

Modification 2

When the distance and velocity measurement is performed based on a part of the detection signal cut out in a short period of time like the example of FIG. 24, it is desirable to cut out a signal within a range where the behavior of the detection signal is stable against the control voltage. In the example of FIG. 24, the detection signal is unstable and repeatedly rises and falls in time periods b and d. On the other hand, in time periods a and c, the detection signal monotonically rises with an increase in the control voltage and is stable, although nonlinear, compared to the time periods b and d. The signals used in distance and velocity measurement may be cut out of the detection signal in a period of time within a certain range of control voltage. In this case, the correction table may hold correction values only within the range of control voltage used in measurement, and the range is individually set for the up-chirp and down-chirp of the control voltage. In Modification 2, in step S1130 illustrated in FIG. 16, the processing circuit 140 acquires the detection signal when the control voltage is within a predetermined range.

The correction data for the up-chirp may be data such as a table or a function that defines correspondence relationship between the control voltage and correction values in a first time period (the time period a in FIG. 24, for example) as a part of the up-chirp duration. The correction data for the down-chirp may be data such as a table or a function that defines correspondence relationship between the control voltage and correction values in a second time period (the time period c in FIG. 24, for example) as a part of the down-chirp duration. In this case, the processing circuit 140 extracts from the detection signal, a first signal corresponding to the first time period and a second signal corresponding to the second time period. The processing circuit 140 corrects the first signal based on correction values in the correction data for the up-chirp to create a first corrected signal. The processing circuit 140 corrects the second signal based on the correction values in the correction data for the down-chirp to create a second corrected signal. The processing circuit 140 is able to determine at least one of the distance and velocity of the object 300 based on the first and second corrected signals.

According to Modification 2, it is possible to perform stable measurement while reducing the amount of data held in the storage apparatus 150.

Modification 3

Figure 25:
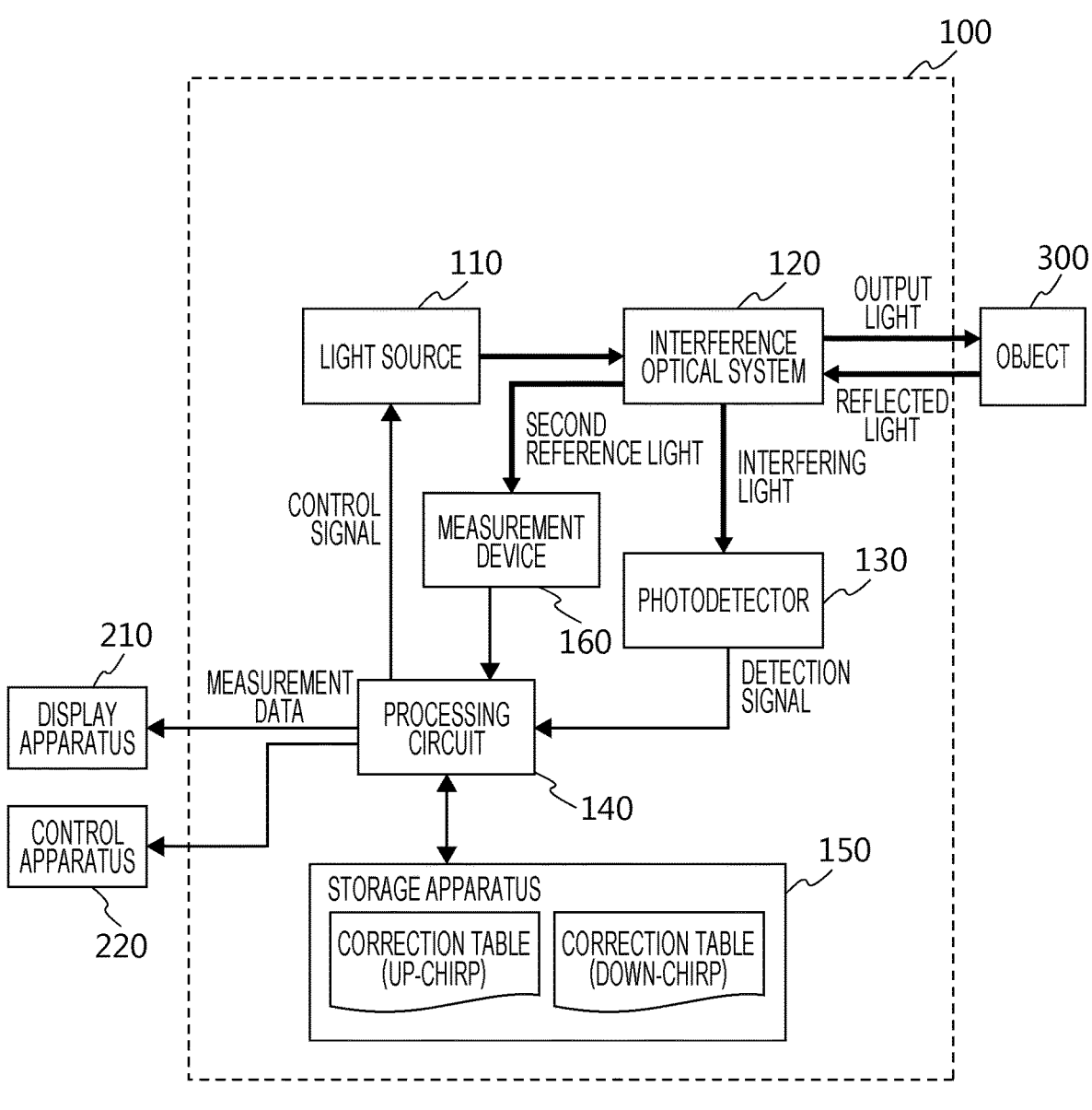
FIG. 25 is a block diagram illustrating a schematic configuration of a measurement apparatus according to Modification 3 of Embodiment 1.

FIG. 25 is a block diagram illustrating a schematic configuration of the measurement apparatus 100 according to Modification 3 of Embodiment 1. In Modification 3, the measurement apparatus 100 includes a measurement device 160 measuring the frequency or wavelength of light in addition to the constituent elements illustrated in FIG. 2.

The interference optical system 120 in Modification 3 splits laser light emitted from the light source 110 into output light, first reference light, and second reference light. The output light is emitted toward the object 300. The first reference light corresponds to the reference light in Embodiment 1 and interferes with reflected light from the object 300 and enters the photodetector 130 as interfering light. The second reference light enters the measurement device 160.

The wavelength measurement device 160 receives the second reference light, detects the wavelength or frequency of the second reference light, and sends a signal indicating the result of detection to the processing circuit 140.

The processing circuit 140 acquires a detection signal that is outputted from the photodetector and indicates change with time in strength of the interfering light and a signal that is outputted from the measurement device 160 and indicates the frequency of the second reference light. The processing circuit 140 generates measurement data indicating the distance and/or velocity of the object 300 based on those signals and two correction tables stored in the storage apparatus 150.

The operation of calibration in Modification 3 is summarized as follows:

While the measurement apparatus 100 is at rest, the light source 110 emits laser light toward a stationary object.

The photodetector 130 detects the interfering light between the reflected light from the object and the first reference light and outputs a detection signal.

The measurement device 160 measures the wavelength or frequency of the second reference light and outputs a signal indicating the measurement value.

Based on the detection signal outputted from the photodetector 130 and the signal outputted from the measurement device 160, the processing circuit 140 creates a correction table for correcting the detection signal so that the frequency of the spectral peak of the interfering light corresponding to the up-chirp duration and the frequency of the spectral peak of the interfering light corresponding to the down-chirp duration can correspond to the distance to the object independently of the frequency of the second reference light and stores the created correction table in the storage apparatus 150.

The distance and velocity measurement operation in Modification 3 is summarized as follows:

The light source 110 emits laser light whose frequency is modulated toward an object.

The photodetector 130 detects the interfering light between the reflected light from the object and the reference light and outputs a detection signal.

For at least one of the up-chirp duration and down-chirp duration, the processing circuit 140 corrects the detection signal in accordance with the frequency of the second reference light based on the correction table and determines the distance from the measurement apparatus 100 to the object based on the spectral peak of the corrected detection signal. Furthermore, the processing circuit 140 determines the relative velocity of the object to the measurement apparatus 100 based on the difference between the spectral peaks in the up- and the down-chirp durations.

Figure 26A:
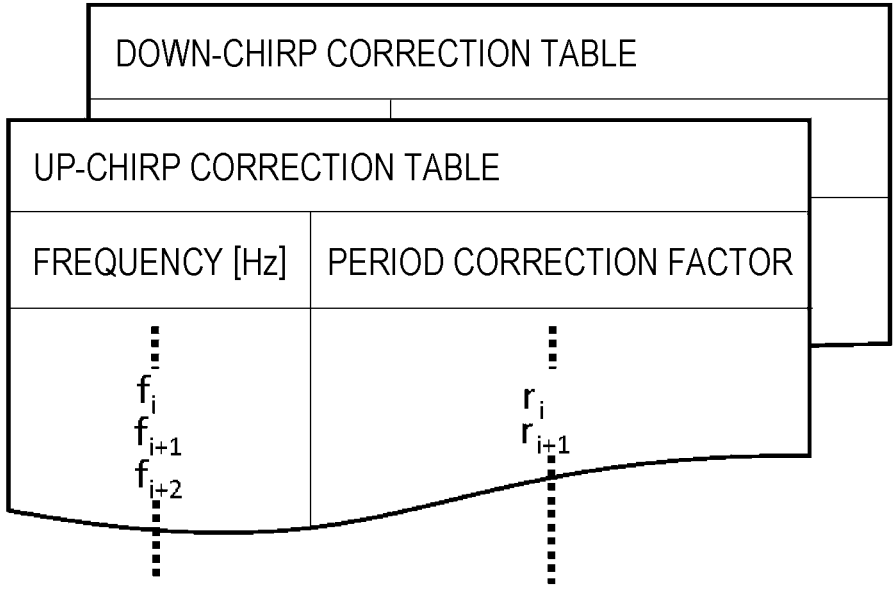
FIG. 26A is a diagram illustrating a correction table example for up-chirp and a correction table example for down-chirp according to Modification 3 of Embodiment 1.
Figure 26B:
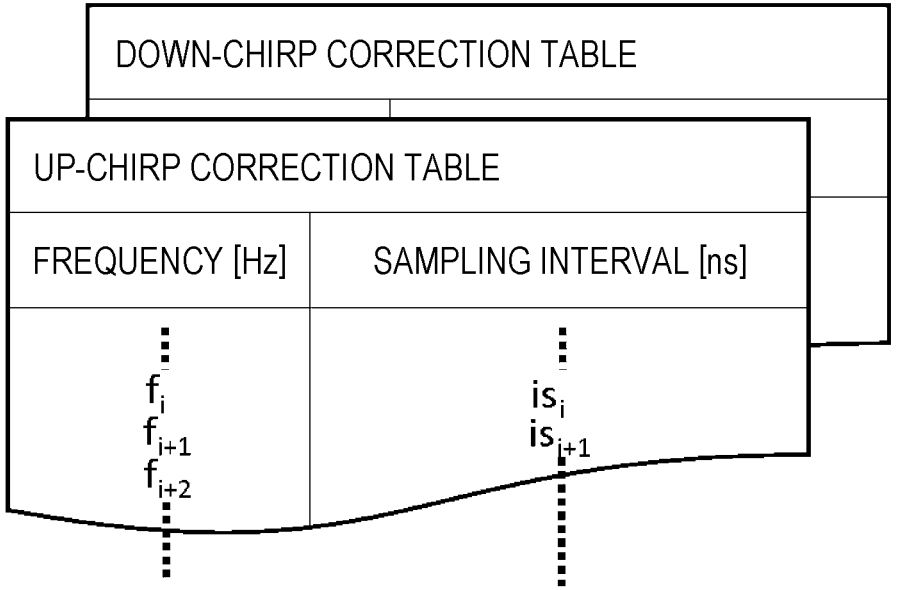
FIG. 26B is a diagram illustrating another correction table example for up-chirp and another correction table example for down-chirp according to Modification 3 of Embodiment 1.

FIGS. 26A and 26B are diagrams illustrating correction table examples for the up-chirp and down-chirp in Modification 3. Each correction table illustrated in FIG. 26A includes information on frequencies of the second reference light measured by the measurement device 160 and the period correction factors corresponding to the respective frequencies. Each correction table illustrated in FIG. 26B includes information on frequencies of the second reference light measured by the measurement device 160 and sampling intervals corresponding to the respective frequencies. As described above, the correction tables of Modification 3 define correspondence relationship between frequencies of the second reference light and correction values. The correction tables may define correspondence relationship between wavelengths of the second reference light and correction values.

Modification 3 uses a correction table that defines correspondence relationship between frequencies or wavelengths of light emitted from the light source 110 and correction values, instead of the correction table that defines the correspondence relationship between the driving voltage and correction values. Since the driving voltage correlates with the frequency or wavelength of the light emitted from the light source 110, using the frequency or wavelengths of the emitted light instead of the driving voltage can provide the same effect as that of Embodiment 1.

In Modification 3, the distance and velocity may be measured based on a detection signal in a shorter period of time than one period of the frequency modulation like the example illustrated in FIG. 24. In this case, the first correction data may be data of a table or a function that defines correspondence relationship between wavelengths or frequencies of the second reference light and correction values in the first time period as a part of the up-chirp duration. Similarly, the second correction data may be data of a table or a function that defines correspondence relationship between wavelengths or frequencies of the second reference light and correction values in the second time period as a part of the down-chirp duration. The processing circuit 140 extracts from the detection signal, a first signal corresponding to the first time period and a second signal corresponding to the second time period. The processing circuit 140 corrects the first signal based on the correction values in the first correction data to generate a first corrected signal. The processing circuit 140 corrects the second signal based on the correction values in the second correction data to generate a second corrected signal. The processing circuit 140 is able to determine the beat frequency of each chirp duration based on the first and second corrected signals and determines the distance and/or velocity of the object 300.

Experiment Example for Explaining Effect of Embodiment

Figure 27:
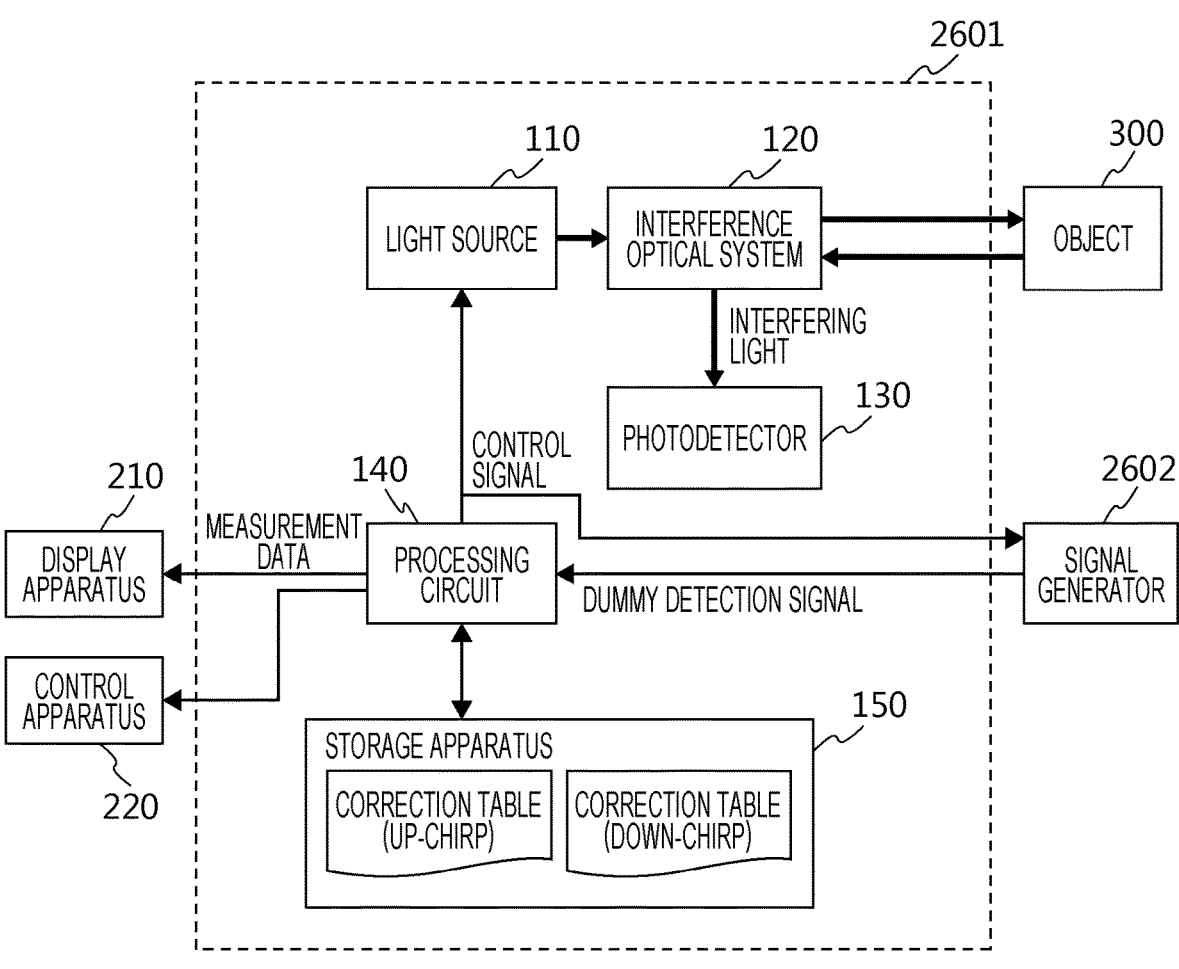
FIG. 27 is a block diagram illustrating a measurement apparatus configuration of an experiment example for exploring the effect of Embodiment of the present disclosure.

FIG. 27 is a diagram illustrating a measurement apparatus 2601 in an experiment example for exploring the effect of the embodiment of the disclosure. In the measurement apparatus 2601, unlike the configuration of the measurement apparatus 100 illustrated in FIG. 2, a dummy detection signal outputted from an external signal generator 2602 is inputted to the processing circuit 140 instead of the detection signal from the photodetector 130. The signal generator 2602 acquires a control signal outputted from the processing circuit 140 to the light source 110 and generates a dummy detection signal synchronized with the frequency modulation of the laser light outputted by the light source 110. Herein, the dummy detection signal is a pseudo sine wave whose frequency changes. The amplitude and the center frequency of the pseudo sine wave are set to values (1 Vpp and 50 MHz, for example) close to the amplitude and the frequency of actual detection signals, respectively. The dummy detection signal includes a detection signal synchronized with the up-chirp duration of the frequency modulation of the laser light and a detection signal synchronized with the down-chirp duration. The detection signals in the up- and down-chirp durations differ in terms of the frequency range and the timing of frequency change.

The storage apparatus 150 in the experiment example also stores different correction tables for the up-chirp and down-chirp in a similar manner to the aforementioned embodiment. It is assumed that the measurement apparatus 2601 executes the measurement operation while the dummy detection signal is inputted to the processing circuit 140 and the correction tables for the up-chirp and down-chirp are applied. Since each distance value measured herein is an average of the distance value measured in the up-chirp duration and the distance value measured in the down-chirp duration, the variation in distance values is the sum of the variation in distance values in the up-chirp duration and the variation in distance values in the down-chirp duration.

First, it is assumed that the frequency range of the dummy detection signal is set to zero in both the up- and the down-chirp durations, that is, the dummy detection signal is a sine wave with consistent frequency. In this case, the dummy detection signal is subjected to correction corresponding to each of the correction tables for the up-chirp and down-chirp, producing a variation in distance values depending on the correction. Herein, the variation in distance values obtained by plural measurements is set to σoo.

Next, it is assumed that the change in frequency of the dummy detection signal in the up-chirp duration is different from that in the down-chirp duration. When only the frequency range of the dummy detection signal in the up-chirp duration is set to a and the frequency range in the down-chirp duration is set to zero, the variation in distance values obtained by plural measurements is set to $\sigma_{a0}$. When only the frequency range of the dummy detection signal in the down-chirp duration is set to a and the frequency range in the up-chirp duration is set to zero, the variation in distance values obtained by multiple measurements is set to $\sigma_{0a}$. Herein, the patterns of frequency change in the up-chirp duration with the frequency range set to a and the down-chirp duration with the frequency range set to a are of the same.

When the experiment described above is carried out, the variations $\sigma_{a0}$ and $\sigma_{0a}$ in distance values is expected to be $\sigma_{a0} \neq \sigma_{0a}$. The reason therefor is that when different correction tables are applied to dummy detection signals whose frequencies change within the same range and in the same pattern, the corrected detection signals have different spectral line widths, producing a difference in the variation in distance values. Comparing the above-described cases in which two types of dummy detection signals are inputted, the variations in distance values produced in the up-chirp durations are different from each other, and the variations in distance values produced in the down-chirp durations are different from each other. The variations in distance values calculated by averaging the distance values obtained in the up- and down-chirp durations are therefore different from each other.

On the other hand, in a conventional apparatus that applies correction to the beat signal frequency after the frequency analysis, even when correction is differently applied to the up-chirp duration and the down-chirp duration, the spectral line width of the original beat signal remains unchanged, and the variations $\sigma_{a0}$ and $\sigma_{0a}$ in distance values are expected to be $\sigma_{a0} = \sigma_{0a}$.

The experiment described above reveals that the measurement apparatus according to the embodiment of the present disclosure controls the variation in distance values by applying different correction tables to the detection signal in the up-chirp duration and the down-chirp duration before the frequency analysis.

In the embodiment of the present disclosure described above, the detection signal is corrected before the frequency analysis. This can reduce degradation of the measurement accuracy due to the non-linearity of the frequency modulation of the laser light. As for the same problem, the non-linearity can be eliminated by correcting the control signal used in the frequency modulation of the laser light. However, such a method needs to conduct nonlinear correction for the control signal outputted to the light source. Compared to the difficulties experienced in generating a non-linear control signal and in controlling the current and voltage using the non-linear control signal, correcting the detection signal before the frequency analysis, which is executed at the level of signal processing, is simple and highly accurate. According to the embodiment of the present disclosure, it is therefore possible to perform more simple and more accurate measurement than conventional one.

The measurement apparatus according to the present disclosure can be used in applications including FMCW LiDAR systems mounted on moving bodies, such as automated guided vehicles (AGVs), automobiles, unmanned aerial vehicles, or industrial robots, for example, or monitoring apparatuses.

What is claimed is:

1. A measurement apparatus, comprising:
a light source that emits light whose frequency is modulated;
an interference optical system that splits the light emitted from the light source into reference light and output light and generates interfering light between reflected light resulting from reflection of the output light on an object and the reference light;
a photodetector that receives the interfering light and outputs a detection signal corresponding to strength of the interfering light;
a processing circuit that controls the light source to modulate the frequency of the light in a period including an up-chirp duration in which the frequency increases and a down-chirp duration in which the frequency decreases, and based on the detection signal, generates and outputs measurement data concerning distance and/or velocity of the object; and
a storage apparatus that stores first correction data for the up-chirp duration and second correction data for the down-chirp duration, wherein
the processing circuit generates the measurement data, based on a first corrected signal obtained by correcting a part of the detection signal corresponding to the up-chirp duration based on the first correction data and/or a second corrected signal obtained by correcting a part of the detection signal corresponding to the down-chirp duration based on the second correction data.

2. The measurement apparatus according to claim 1, wherein the processing circuit determines frequency of the first corrected signal and frequency of the second corrected signal, determines distance from the measurement apparatus to the object based on the frequency of the first corrected signal and the frequency of the second corrected signal, and generates the measurement data including information on the distance.

3. The measurement apparatus according to claim 1, wherein the processing circuit determines frequency of the first corrected signal and frequency of the second corrected signal, and
determines velocity of the object based on a difference between the frequency of the first corrected signal and the frequency of the second corrected signal and generates the measurement data including information on the velocity.

4. The measurement apparatus according to claim 1, wherein
the processing circuit changes the frequency of the light emitted from the light source by changing control voltage to be applied to the light source,
the first correction data and the second correction data are data of a table or a function that defines correspondence relationship between the control voltage and a correction value, and
the processing circuit corrects the detection signal based on the correction value corresponding to the control voltage.

5. The measurement apparatus according to claim 4, wherein
the first correction data are data of a table or a function that defines the correspondence relationship between the control voltage and the correction value in a first time period as a part of the up-chirp duration,
the second correction data are data of a table or a function that defines the correspondence relationship between the control voltage and the correction value in a second time period as a part of the down-chirp duration, and the processing circuit extracts from the detection signal, a first signal corresponding to the first time period and a second signal corresponding to the second time period, generates the first corrected signal by correcting the first signal based on the correction value in the first correction data, and generates the second corrected signal by correcting the second signal based on the correction value in the second correction data.

6. The measurement apparatus according to claim 1, wherein the interference optical system splits the light emitted from the light source into the output light, first reference light as the reference light, and second reference light, the measurement apparatus further includes a measurement device that measures wavelength or frequency of the second reference light, and the first correction data and the second correction data are data of a table or a function that defines correspondence relationship between the wavelength or the frequency of the second reference light and a correction value.

7. The measurement apparatus according to claim 6, wherein the first correction data are data of a table or a function that defines the correspondence relationship between the wavelength or the frequency of the second reference light and the correction value in a first time period as a part of the up-chirp duration, the second correction data are data of a table or a function that defines the correspondence relationship between the wavelength or the frequency of the second reference light and the correction value in a second time period as a part of the down-chirp duration, and the processing circuit extracts from the detection signal, a first signal corresponding to the first time period and a second signal corresponding to the second time period, generates the first corrected signal by correcting the first signal based on the correction value in the first correction data, and generates the second corrected signal by correcting the second signal based on the correction value in the second correction data.

8. The measurement apparatus according to claim 1, wherein the processing circuit causes the light source to emit the light in which a period of frequency modulation is consistent, and the first correction data and the second correction data are data of a table or a function that defines correspondence relationship between a phase in the period of the frequency modulation and a correction value.

9. The measurement apparatus according to claim 1, wherein the first correction data and the second correction data are data of a table or a function that defines correspondence relationship between time from a reference point of time in frequency modulation of the light source and a correction value.

10. The measurement apparatus according to claim 1, wherein the first correction data and the second correction data are data of a table or a function that includes information on a correction value to alter timing of sampling of the detection signal.

11. A method executed by a computer in a system including a measurement apparatus that includes a light source that emits light whose frequency is modulated in a period including an up-chirp duration in which the frequency increases and a down-chirp duration in which the frequency decreases, an interference optical system that splits the light emitted from the light source into reference light and output light and generates interfering light between reflected light resulting from reflection of the output light on an object and the reference light, a photodetector that receives the interfering light and outputs a detection signal corresponding to strength of the interfering light, and a storage apparatus that stores first correction data for the up-chirp duration and second correction data for the down-chirp duration, the method comprising:

generating a first corrected signal by correcting a part of the detection signal corresponding to the up-chirp duration based on the first correction data and/or a second corrected signal by correcting a part of the detection signal corresponding to the down-chirp duration based on the second correction data; and generating and outputting measurement data concerning distance and/or velocity of the object based on the first corrected signal and/or the second corrected signal.

12. A non-transitory computer-readable medium having a program executed by a computer, the computer being configured to control a measurement apparatus, wherein the measurement apparatus includes a light source that emits light whose frequency is modulated in a period including an up-chirp duration in which the frequency increases and a down-chirp duration in which the frequency decreases, an interference optical system that splits the light emitted from the light source into reference light and output light and generates interfering light between reflected light resulting from reflection of the output light on an object and the reference light, a photodetector that receives the interfering light and outputs a detection signal corresponding to strength of the interfering light, and a storage apparatus that stores first correction data for the up-chirp duration and second correction data for the down-chirp duration, the program causing the computer to execute operations comprising:

generating a first corrected signal by correcting a part of the detection signal corresponding to the up-chirp duration based on the first correction data and/or a second corrected signal by correcting a part of the detection signal corresponding to the down-chirp duration based on the second correction data; and generating and outputting measurement data concerning distance and/or velocity of the object based on the first corrected signal and/or the second corrected signal.

* * * * *